(12) United States Patent
Huang et al.

(10) Patent No.: US 12,388,428 B2
(45) Date of Patent: *Aug. 12, 2025

(54) INTEGRATED CIRCUIT HAVING LATCH WITH TRANSISTORS OF DIFFERENT GATE WIDTHS

(71) Applicant: TAIWAN SEMICONDUCTOR MANUFACTURING COMPANY, LTD., Hsinchu (TW)

(72) Inventors: Ching-Yu Huang, Hsinchu (TW); Jiann-Tyng Tzeng, Hsinchu (TW); Wei-Cheng Lin, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/676,873

(22) Filed: May 29, 2024

(65) Prior Publication Data

US 2024/0333266 A1    Oct. 3, 2024

Related U.S. Application Data

(63) Continuation of application No. 18/160,630, filed on Jan. 27, 2023, now Pat. No. 12,003,242.

(Continued)

(51) Int. Cl.
*H03K 3/3562* (2006.01)
*G06F 30/392* (2020.01)
*H03K 3/037* (2006.01)

(52) U.S. Cl.
CPC ....... *H03K 3/35625* (2013.01); *G06F 30/392* (2020.01); *H03K 3/0372* (2013.01)

(58) Field of Classification Search
CPC . H03K 3/0372; H03K 3/3562; H03K 3/35625
See application file for complete search history.

(56) References Cited

U.S. PATENT DOCUMENTS 6,198,324 B1    3/2001 Schober
12,003,242 B2 *    6/2024 Huang ............. H03K 3/356121
(Continued)

FOREIGN PATENT DOCUMENTS

CN    104617915    4/2017
KR    10-2020-0019833    2/2020
(Continued)

*Primary Examiner* — Patrick O Neill
(74) *Attorney, Agent, or Firm* — Hauptman Ham, LLP

(57) ABSTRACT

An integrated circuit includes a first inverter and a first transmission gate constructed with wide type-one transistors and wide type-two transistors. The integrated circuit also includes a first clocked inverter constructed with narrow type-one transistors and narrow type-two transistors. A latch is formed with the first inverter and the first clocked inverter. The first transmission gate is connected to between an output of the first inverter. The wide type-one transistors are formed in a wide type-one active-region structure and the narrow type-one transistors are formed in a narrow type-one active-region structure. The wide type-two transistors are formed in a wide type-two active-region structure and the narrow type-two transistors are formed in in a narrow type-two active-region structure.

20 Claims, 23 Drawing Sheets

Related U.S. Application Data

(60) Provisional application No. 63/381,887, filed on Nov. 1, 2022.

(56) References Cited

U.S. PATENT DOCUMENTS

| | | |
|---|---|---|
| 2002/0093368 A1 | 7/2002 | Fulkerson |
| 2015/0381154 A1 | 12/2015 | Maeno |
| 2021/0005634 A1 | 1/2021 | Lai et al. |
| 2021/0343744 A1 | 11/2021 | Chiu |
| 2023/0062075 A1 | 3/2023 | Toki |

FOREIGN PATENT DOCUMENTS

| | | |
|---|---|---|
| TW | 201513573 | 4/2015 |
| TW | I715809 | 1/2021 |
| TW | 202241059 | 10/2022 |

\* cited by examiner

INTEGRATED CIRCUIT HAVING LATCH WITH TRANSISTORS OF DIFFERENT GATE WIDTHS

PRIORITY CLAIM

The present application is a continuation of U.S. application Ser. No. 18/160,630, filed Jan. 27, 2023, now U.S. Pat. No. 12,003,242, issued Jun. 4, 2024, which claims the priority of U.S. Provisional Application No. 63/381,887, filed Nov. 1, 2022, each of which is incorporated herein by reference in its entirety.

BACKGROUND

The recent trend in miniaturizing integrated circuits (ICs) has resulted in smaller devices which consume less power yet provide more functionality at higher speeds. The miniaturization process has also resulted in stricter design and manufacturing specifications as well as reliability challenges. Various electronic design automation (EDA) tools generate, optimize and verify standard cell layout designs for integrated circuits while ensuring that the standard cell layout design and manufacturing specifications are met.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
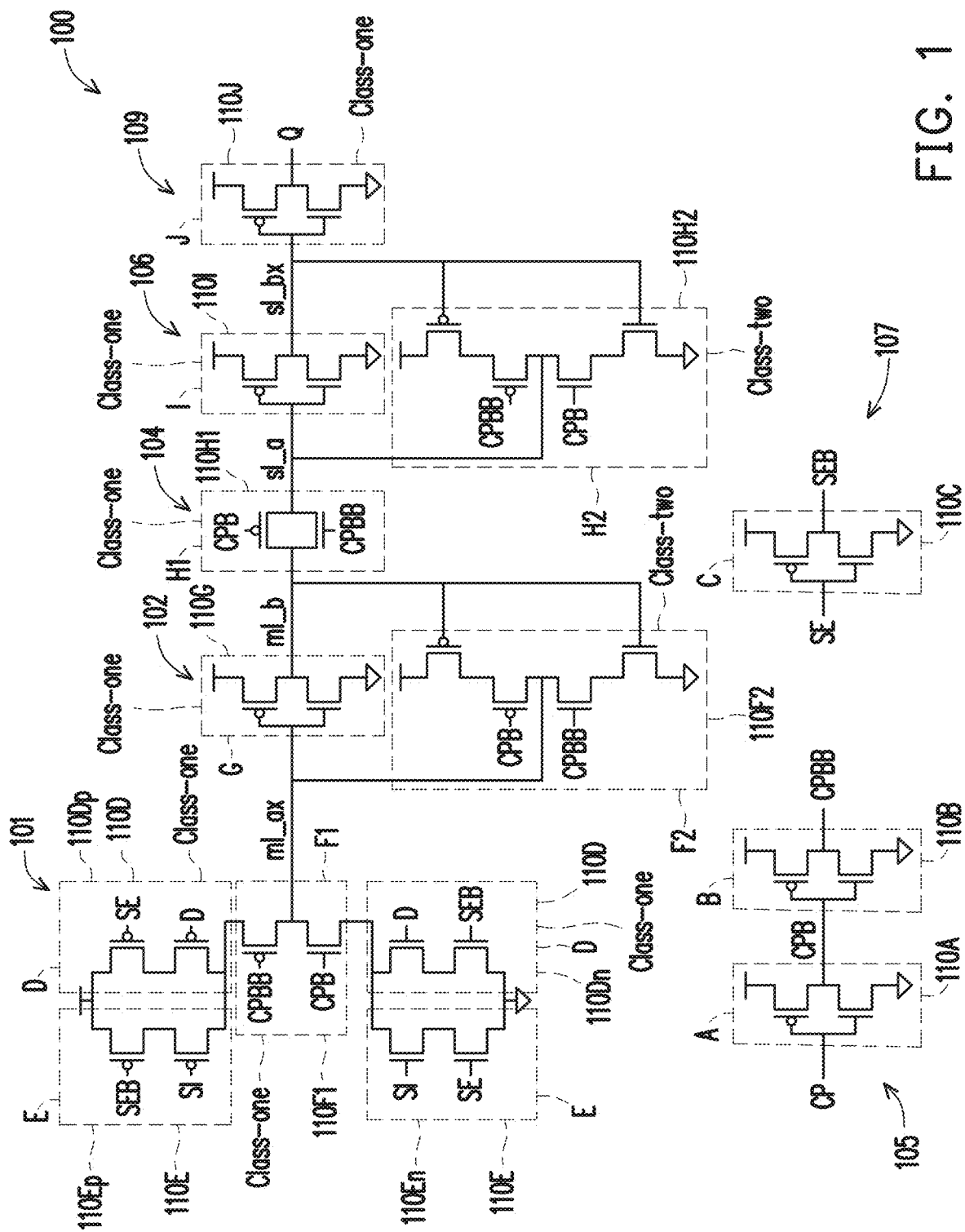
FIG. 1 is a circuit diagram of an integrated circuit having a master-slave flip-flop and the associated supporting circuits, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, a master-slave flip-flop includes a transmission gate coupled between a master latch and a slave latch. The master latch includes a first inverter and a first clocked inverter. The slave latch includes a second inverter and a second clocked inverter. The output of the first inverter and the input of the first clocked inverter are connected to the input of the transmission gate, while the input of the first inverter and the output of the first clocked inverter are connected together. The input of the second inverter and the output of the second clocked inverter are connected to the output of the transmission gate, while the output of the second inverter and the input of the second clocked inverter are connected together. The first inverter, the transmission gate, and the second inverter are constructed with wide transistors in wide active-region structures, whereby the time delay along the forward data path in the master-slave flip-flop is reduced. The first clocked inverter and the second clocked inverter are constructed with narrow transistors in narrow active-region structures. The average gate width of the wide transistors is larger than the average gate width of the narrow transistors. In some embodiments, the first inverter, the transmission gate, and the second inverter in the wide active-region structures also form an ordered list following the forward data path in the master-slave flip-flop circuit, whereby the time delay along the forward data path in the master-slave flip-flop is reduced.

FIG. 1 is a circuit diagram of an integrated circuit 100 having a master-slave flip-flop and the associated supporting circuits, in accordance with some embodiments. The master-slave flip-flop is formed with a clock gated input circuit 101, a master latch 102, a transmission gate 104, a slave latch 106, and an output driver 109. The master latch 102 is coupled between the clock gated input circuit 101 and the transmission gate 104. The slave latch 106 is coupled between the transmission gate 104 and the output driver 109. The associated supporting circuits includes a clock supporting circuit 105 implemented with two inverters 110A and 110B. The associated supporting circuits also includes a data input supporting circuit 107 implemented with an inverter 110C. The clock supporting circuit 105 receives a clock signal CP and generates an inverted clock signal CPB and an in-phase clock signal CPBB. The data input supporting circuit 107 receives a scan enable signal SE and generates an inverted scan enable signal SEB.

The clock gated input circuit 101 includes a transmission gate 110F1, a gated inverter 110D, and a gated inverter 110E. The gated inverter 110D is configured to receive a data signal D, and the gated inverter 110E is configured to receive a scan signal SI. Each of the gated inverter 110D and the gated inverter 110E includes a first part (labeled correspondingly as 110Dp and 110Ep) having the PMOS transistors and a second part (labeled correspondingly as 110Dn and 110En) having the NMOS transistors.

Each of the gated inverter 110D and the gated inverter 110E is configured to receive the scan enable signal SE and the inverted scan enable signal SEB. The combination of the gated inverter 110D and the gated inverter 110E forms a multiplexer. When the scan enable signal SE is at logic LOW (and the inverted scan enable signal SEB is at logic HIGH), the data signal D is selected as the input signal coupled to the transmission gate 110F1, and the scan signal SI is decoupled from the transmission gate 110F1. Alternatively, when the scan enable signal SE is at logic HIGH (and the inverted scan enable signal SEB is at logic LOW), the scan signal SI is selected as the input signal coupled to the transmission gate 110F1, and the data signal D is decoupled from the transmission gate 110F1.

The transmission gate 110F1 is configured to receive the inverted clock signal CPB and the in-phase clock signal CPBB. When the inverted clock signal CPB is at logic LOW (and the in-phase clock signal CPBB is at logic HIGH), none of the data signal D and the scan signal SI is transmitted at the input node ml_ax of the master latch 102. When the inverted clock signal CPB is at logic HIGH (and the in-phase clock signal CPBB is at logic LOW), the inverse of the selected input signal (which is either the data signal D or the scan signal SI) is transmitted to the input node ml_ax of the master latch 102. Here, the inverse of the data signal D is transmitted to the input node ml_ax when the scan enable signal SE is at logic LOW, but the inverse of the scan signal SI is transmitted to the input node ml_ax when the scan enable signal SE is at logic HIGH.

In FIG. 1, the master latch 102 includes an inverter 110G and a clocked inverter 110F2 driven by the clock signals CPB and CPBB. The output of the inverter 110G is connected to the input of the clocked inverter 110F2, while the output of the clocked inverter 110F2 is connected to the input of the inverter 110G. When the clock signal CPB is at logic HIGH (and the clock signal CPBB is at logic LOW), the master latch 102 is at the unlatched state, the signal at the output node ml_b of the master latch 102 is the inverse of the signal at the input node ml_ax of the master latch 102. Consequently, the signal at the output node ml_b becomes the inverse of the selected input signal (which is either the data signal D or the scan signal SI) received from the clock gated input circuit 101. Meanwhile, the transmission gate 104 is set to the non-connected state by the clock signals CPB and CPBB, and the input node sl_a of the slave latch 106 is decoupled from the output node ml_b of the master latch 102. Thereafter, when the inverted clock signal CPB is change to logic LOW (and the in-phase clock signal CPBB is change to logic HIGH), the master latch 102 is changed to the latched state, the signal at the output node ml_b of the master latch 102 is maintained during the time period that the clock signal CPB at logic LOW (and the clock signal CPB at logic HIGH). The latched signal value at the output node ml_b is the signal value of the selected input signal (received from the clock gated input circuit 101) at a first falling edge of the clock signal CPB, as the clock signal CPB is changed to logic LOW.

When the clock signal CPB is change to logic LOW (and the clock signal CPBB is change to logic HIGH), the transmission gate 104 is changed to the connected state by the clock signals CPB and CPBB, and the latched signal at the output node ml_b of the master latch 102 is transmitted to the input node sl_a of the slave latch 106. In the embodiment as shown in FIG. 1, the transmission gate 104 is implemented as a transmission gate 110H1 which has a PMOS transistor receiving the clock signal CPB as the gate voltage and has a NMOS transistor receiving the clock signal CPBB as the gate voltage.

In FIG. 1, the slave latch 106 includes an inverter 110I and a clocked inverter 110H2 driven by the clock signals CPB and CPBB. The output of the inverter 110I is connected to the input of the clocked inverter 110H2, while the output of the clocked inverter 110H2 is connected to the input of the inverter 110I. When the clock signal CPB is at logic LOW (and the signal CPBB is at logic HIGH), the slave latch 106 is at the unlatched state, and the signal at the output node sl_bx of the slave latch 106 is the inverse of the signal at the input node sl_a of the slave latch 106. Consequently, the inverse of the latched signal at the output node ml_b of the master latch 102 is transmitted to the output node sl_bx of the slave latch 106. Thereafter, when the clock signal CPB is change to logic HIGH (and the signal CPBB is change to logic LOW), the slave latch 106 is changed to the latched state, the signal at the output node sl_bx of the slave latch 106 is maintained, and the latched signal value at the output node sl_bx after the current rising edge of the clock signal CPB is the inverse of the latched signal at the output node ml_b which is latched after the previous falling edge (the first falling edge) of the clock signal CPB.

During the time period when the clock signal CPB is at logic HIGH after the current rising edge of the clock signal CPB, the signal value $Q_{n+1}$ at the output Q of the output driver 109 (which is implemented as an inverter 110J) is equal to the signal value of the selected input signal (received from the clock gated input circuit 101) at the previous falling edge (the first falling edge) of the clock signal CPB. That is, $Q_{n+1}=D_n$ when the scan enable signal SE is at logic LOW, and $Q_{n+1}=SI_n$ when the scan enable signal SE is at logic LOW.

In FIG. 1, each of the gated inverter 110D, the transmission gate 110F1, the inverter 110G, the transmission gate 110H1, the inverter 110I, and the inverter 110J is implemented as a class-one device, while each of the clocked inverter 110F2 and the clocked inverter 110H2 is implemented as class-two device. The average gate width of the PMOS transistors in a class-one device is larger than the average gate width of the PMOS transistors in a class-two device. The average gate width of the NMOS transistors in a class-one device is larger than the average gate width of the NMOS transistors in a class-two device. The PMOS transistors in the class-one devices are fabricated in a wide PMOS active-region structure, while the PMOS transistors in the class-two devices are fabricated in a narrow PMOS active-region structure. The NMOS transistors in the class-one devices are fabricated in a wide NMOS active-region structure, while the NMOS transistors in the class-two devices are fabricated in a narrow NMOS active-region structure.

In some embodiments, when the active-region structures are formed with fin structures, the PMOS transistors fabricated in the PMOS active-region structure and in the narrow PMOS active-region structures are p-channel FinFETs, and the NMOS transistors fabricated in the NMOS active-region structure and in the narrow NMOS active-region structures are n-channel FinFETs. In some embodiments, when the active-region structures are formed with nano-sheet structures, the PMOS transistors fabricated in the PMOS active-region structure and in the narrow PMOS active-region structures are p-channel nano-sheet transistors, and the NMOS transistors fabricated in the NMOS active-region structure and in the narrow NMOS active-region structures and n-channel nano-sheet transistors. In some embodiments, when the active-region structures are formed with nano-wire structures, the PMOS transistors fabricated in the PMOS active-region structure and in the narrow PMOS active-region structures are p-channel nano-wire transistors, and the NMOS transistors fabricated in the NMOS active-region structure and in the narrow NMOS active-region structures and n-channel nano-wire transistors.

FIGS. 2A-2G are floor plans of the integrated circuit 100 of FIG. 1, in accordance with some embodiments. In FIGS. 2A-2G, the inverter 110A, the inverter 110B, the inverter 110C, the gated inverter 110D, and the gated inverter 110E are implemented correspondingly in layout areas "A", "B", "C", "D". and "E". The transmission gate 110F1, the clocked inverter 110F2, the inverter 110G, the transmission gate 110H1, and the clocked inverter 110H2 are implemented correspondingly in layout areas "F1", "F2", "G", "H1". and "H2".

Each of the integrated circuits in FIGS. 2A-2G includes a wide PMOS active-region structure 220P extending in the X-direction, a wide NMOS active-region structure 220N extending in the X-direction, a narrow PMOS active-region structure 230P extending in the X-direction, and a narrow NMOS active-region structure 230N extending in the X-direction. Each of the gated inverter 110D, the transmission gate 110F1, the inverter 110G, the transmission gate 110H1, the inverter 110I, and the inverter 110J (correspondingly in the layout areas "D", "F1", "G", "H1", "I", and "J") is constructed with wide transistors in the wide PMOS active-region structure 220P and the wide NMOS active-region structure 220N. Each of the clocked inverter 110F2 and the clocked inverter 110H2 is implemented (correspondingly in the layout areas "F2" and "H2") is constructed with narrow transistors in the narrow PMOS active-region structure 230P and the narrow NMOS active-region structure 230N.

In FIGS. 2A-2G, each of the inverters 110A, 110B, and 110C is selectively implemented either with wide transistors in the wide active-region structures (i.e., 220P and 220N) or with narrow transistors in the narrow active-region structures (i.e., 230P and 230N). In the floor plan 200A of FIG. 2A, the inverter 110A is implemented with wide transistors in the wide active-region structures (i.e., 220P and 220N), while the inverters 110B and 110C are implemented with narrow transistors in the narrow active-region structures (i.e., 230P and 230N). In the floor plan 200B of FIG. 2B, the inverter 110B is implemented with wide transistors in the wide active-region structures (i.e., 220P and 220N), while the inverters 110A and 110C are implemented with narrow transistors in the narrow active-region structures (i.e., 230P and 230N). In each of the floor plans 200C-200G as shown in FIGS. 2C-2G, the inverter 110C is implemented with wide transistors in the wide active-region structures (i.e., 220P and 220N), while the inverters 110A and 110B are implemented with narrow transistors in the narrow active-region structures (i.e., 230P and 230N).

Some example placements of the two wide active-region structures (i.e., 220P and 220N) and the two narrow active-region structures (i.e., 230P and 230N) are depicted in FIGS. 2A-2G.

Figure 2A:
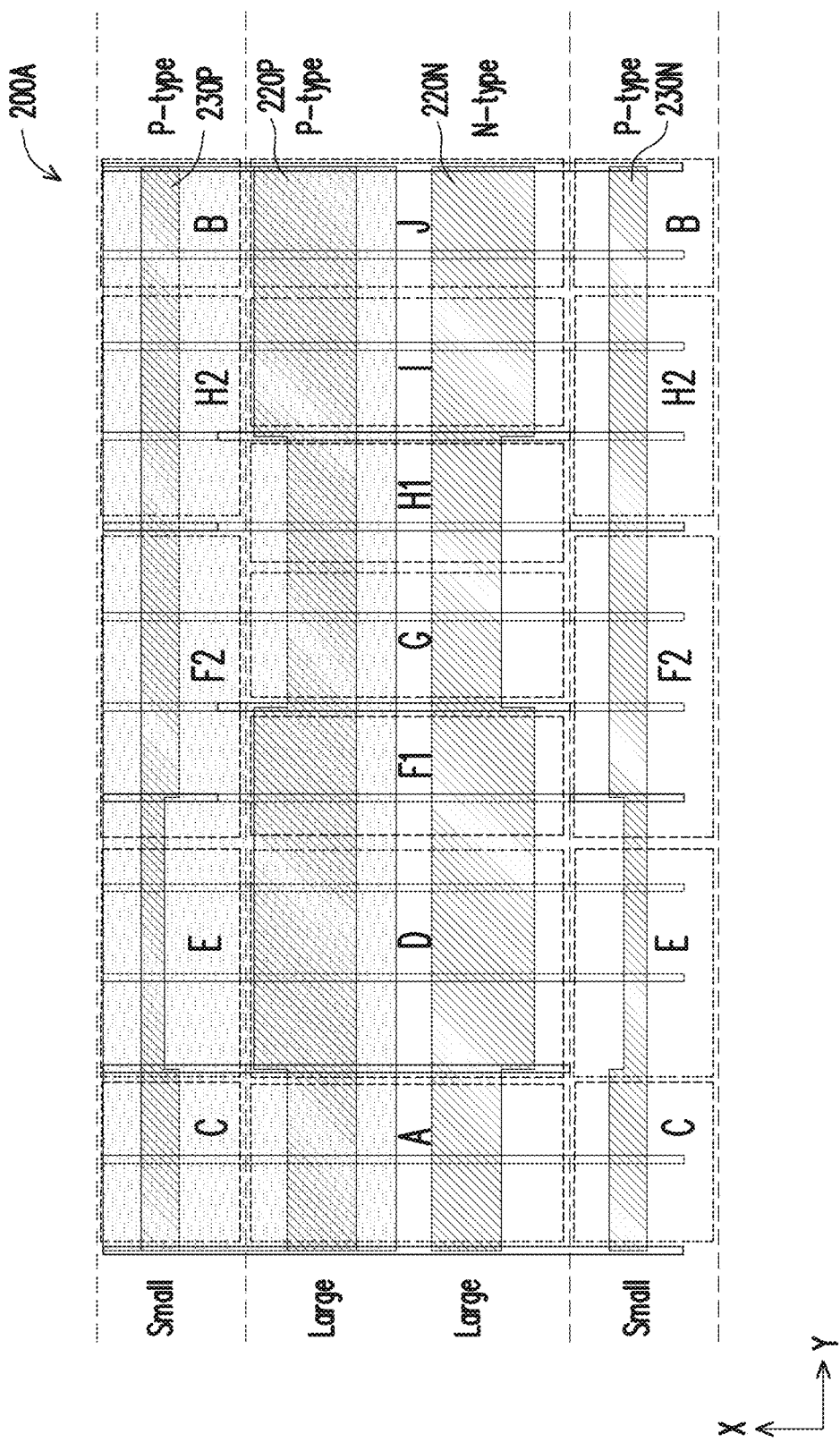
FIGS. 2A-2G are floor plans of the integrated circuit of FIG. 1, in accordance with some embodiments.
Figure 2B:
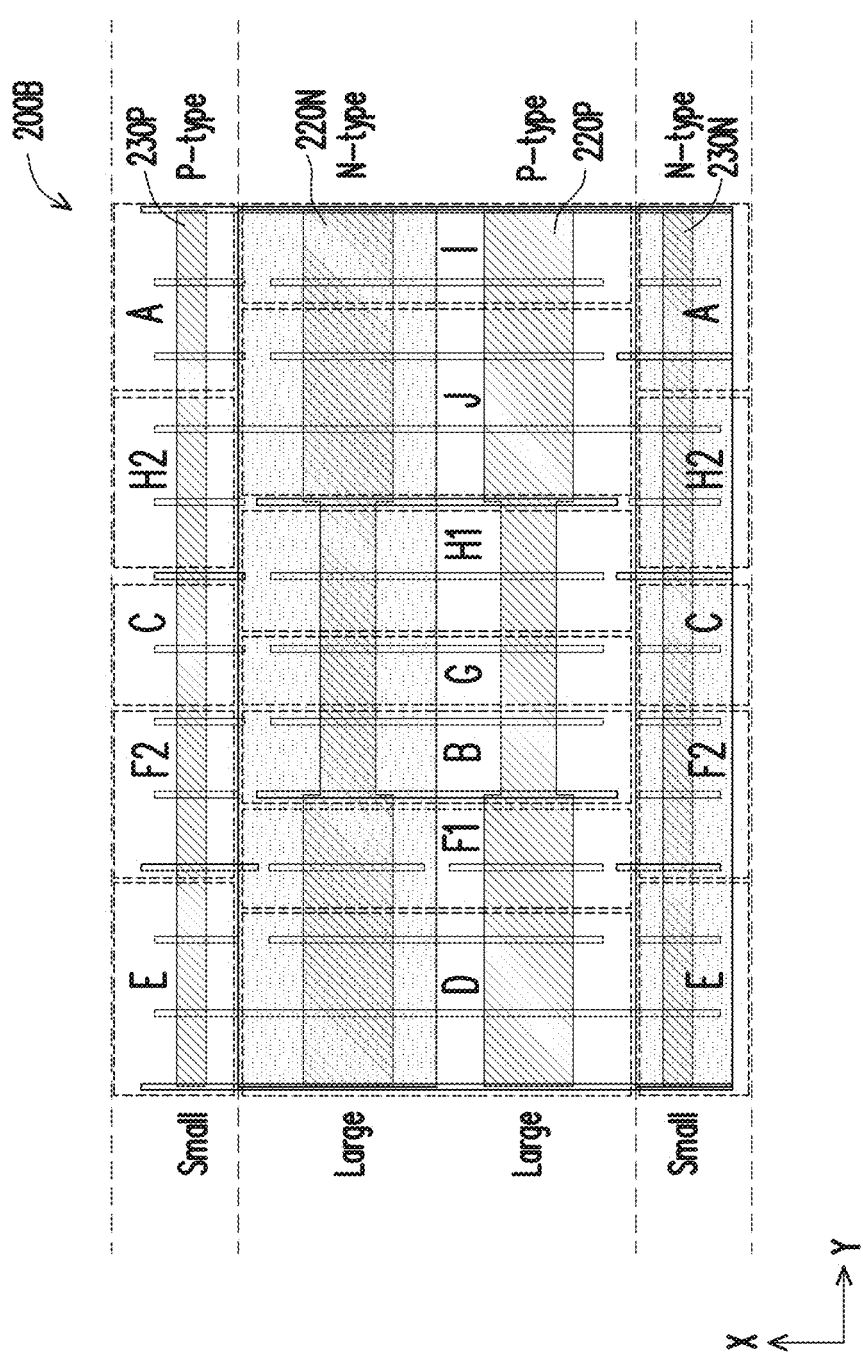
Figure 2C:
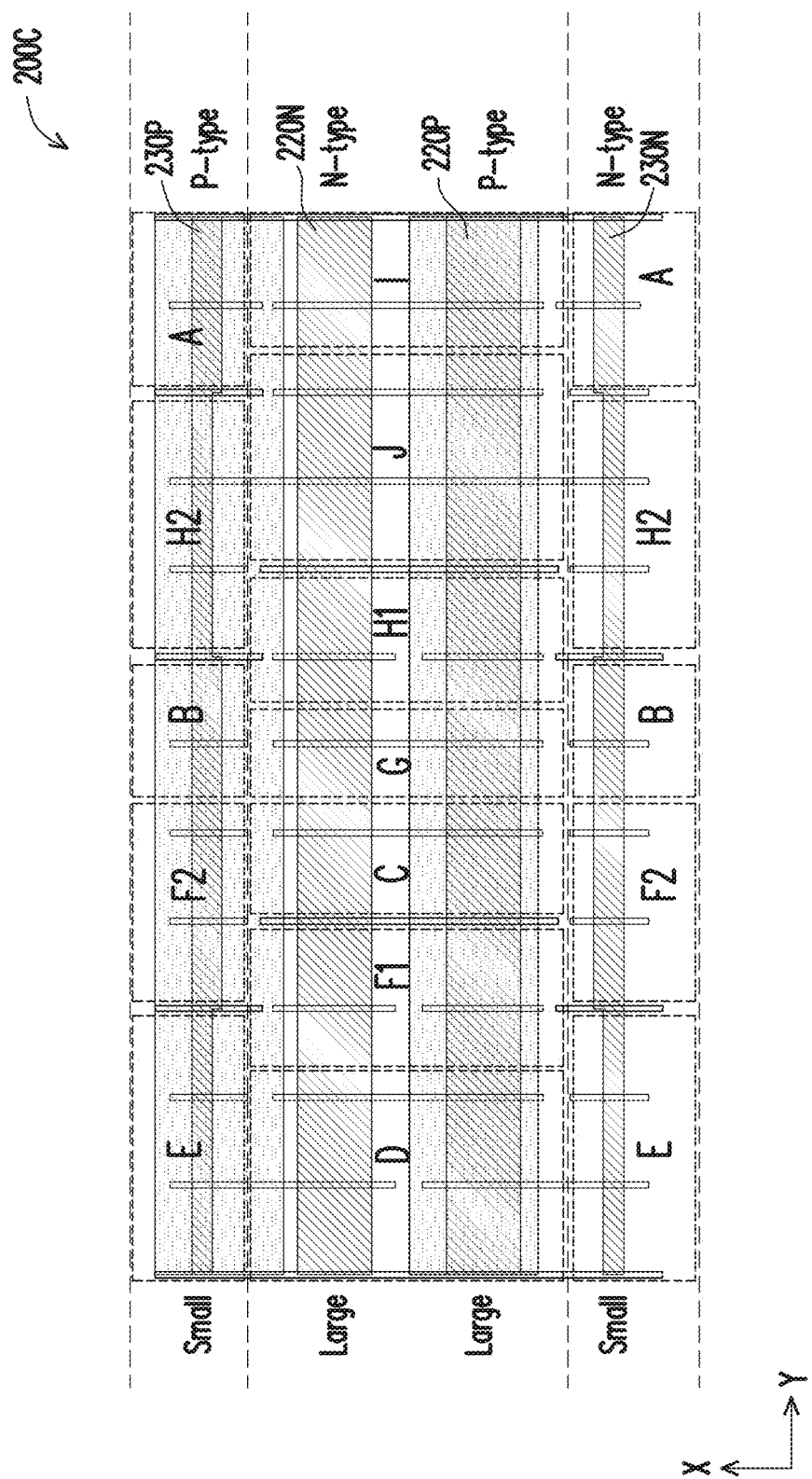

In the floor plans 200A-200C as shown in FIGS. 2A-2C, the two wide active-region structures (i.e., 220P and 220N) are laterally positioned between the two narrow active-region structures (i.e., 230P and 230N). In the floor plan 200A of FIG. 2A, the narrow PMOS active-region structure 230P is adjacent to the wide PMOS active-region structure 220P, while the narrow NMOS active-region structure 230N is adjacent to the wide NMOS active-region structure 220N. In both the floor plan 200B of FIG. 2B and the floor plan 200C of FIG. 2C, the narrow PMOS active-region structure 230P is adjacent to the wide NMOS active-region structure 220N, while the narrow NMOS active-region structure 230N is adjacent to the wide PMOS active-region structure 220P.

Figure 2D:
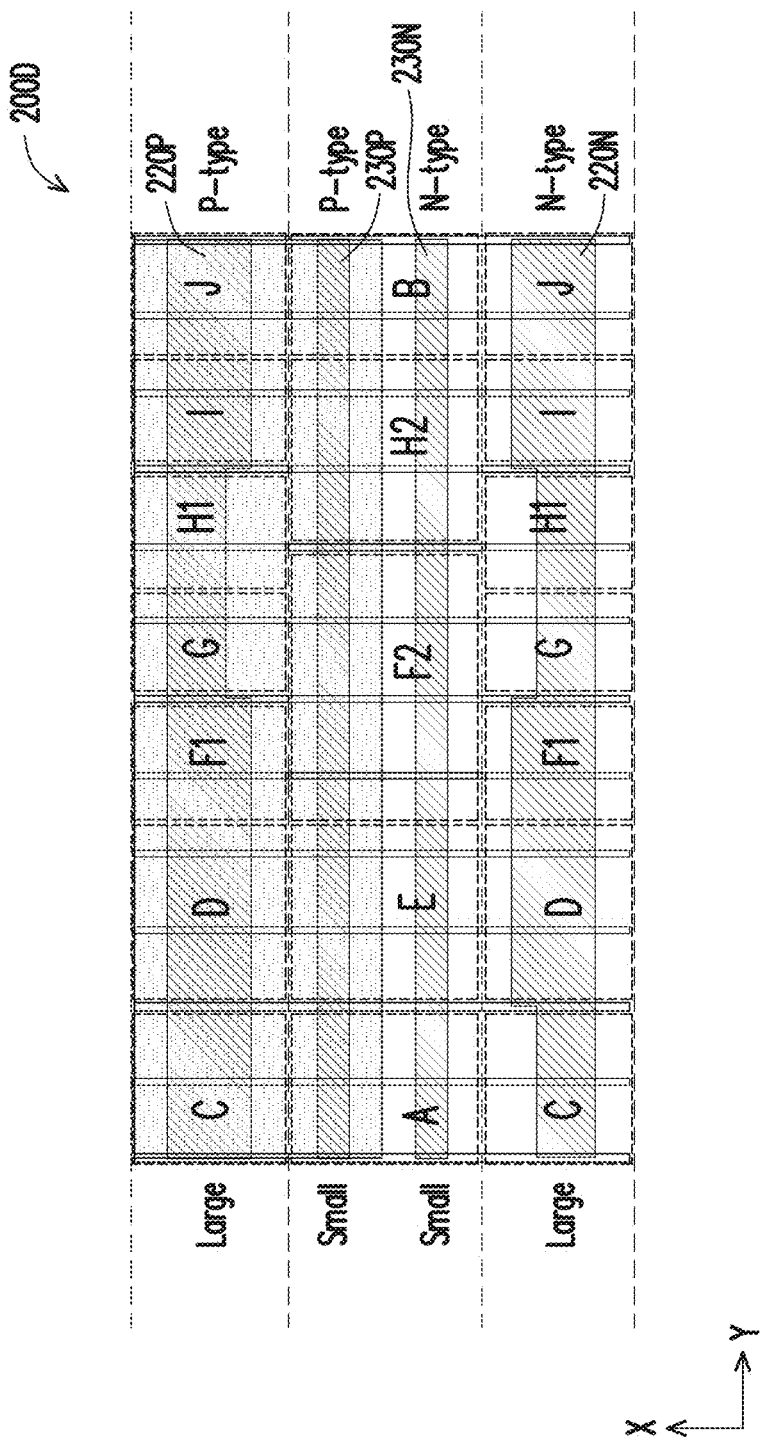
Figure 2E:
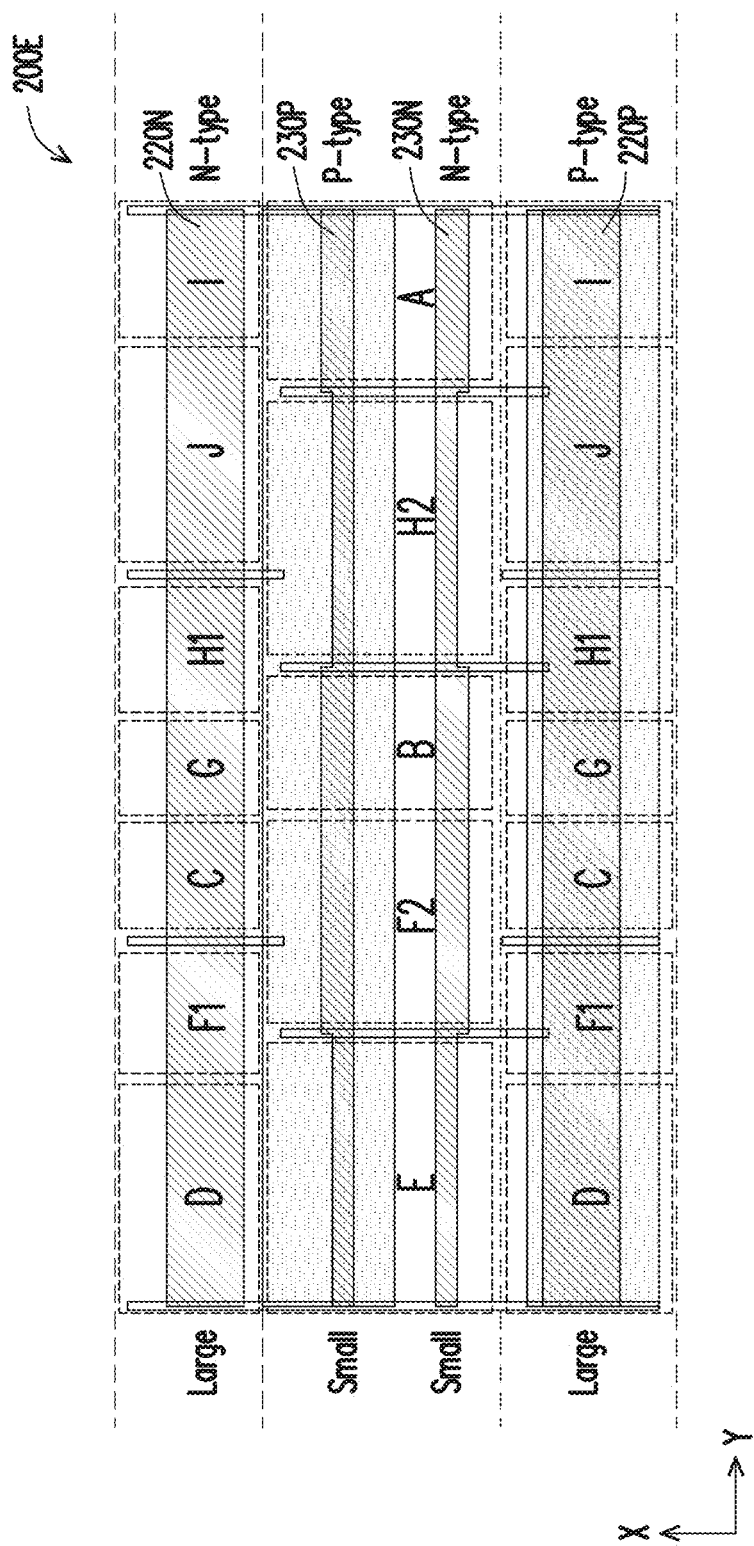

In the floor plans 200D-200E as shown in FIGS. 2D-2E, the two narrow active-region structures (i.e., 230P and 230N) are laterally positioned between the two wide active-region structures (i.e., 220P and 220N). In the floor plan 200D of FIG. 2D, the wide PMOS active-region structure 220P is adjacent to the narrow PMOS active-region structure 230P, while the wide NMOS active-region structure 220N is adjacent to the narrow NMOS active-region structure 230N. In the floor plan 200E of FIG. 2E, the wide NMOS active-region structure 220N is adjacent to the narrow PMOS active-region structure 230P, while the wide PMOS active-region structure 220P is adjacent to the narrow NMOS active-region structure 230N.

Figure 2F:
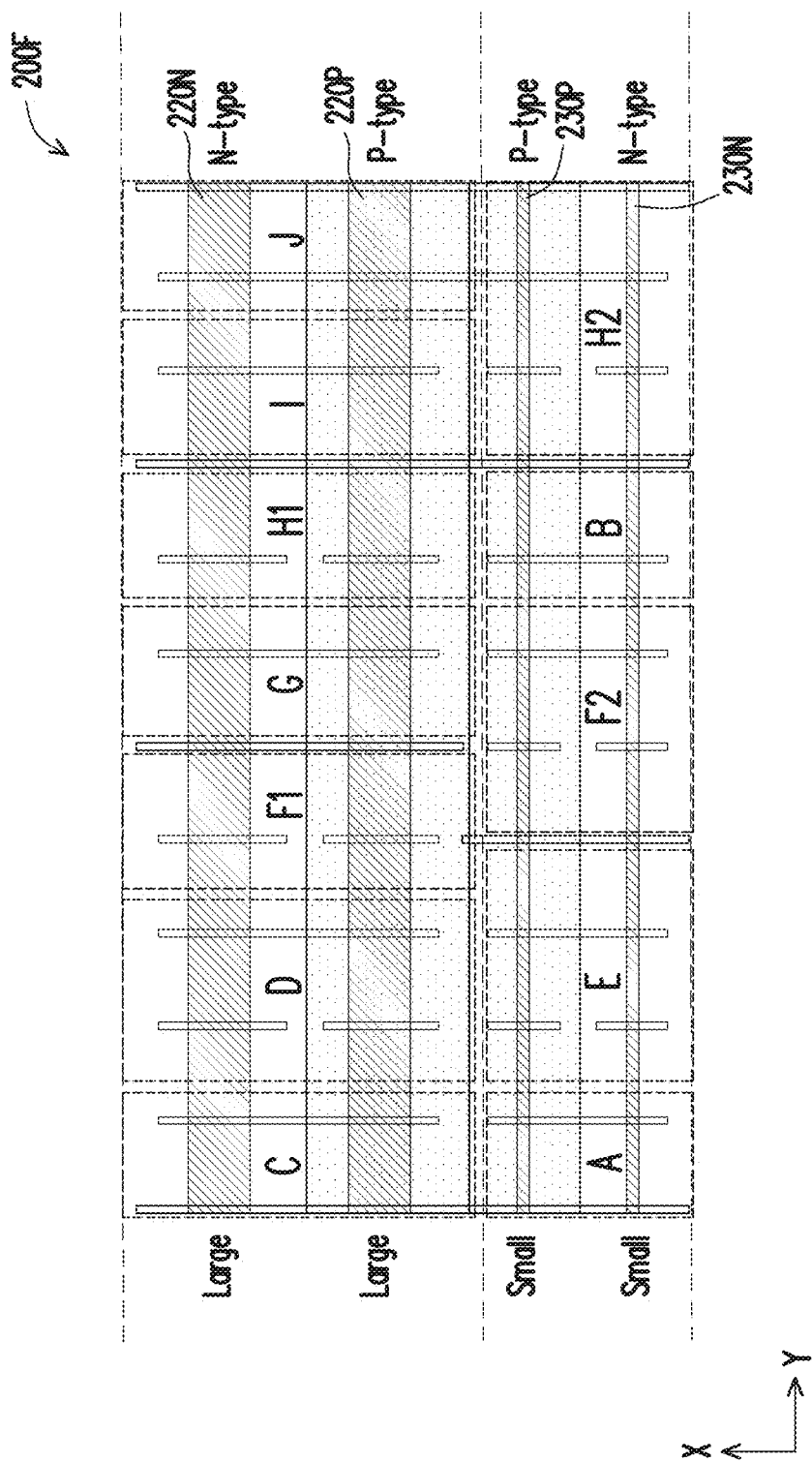
Figure 2G:
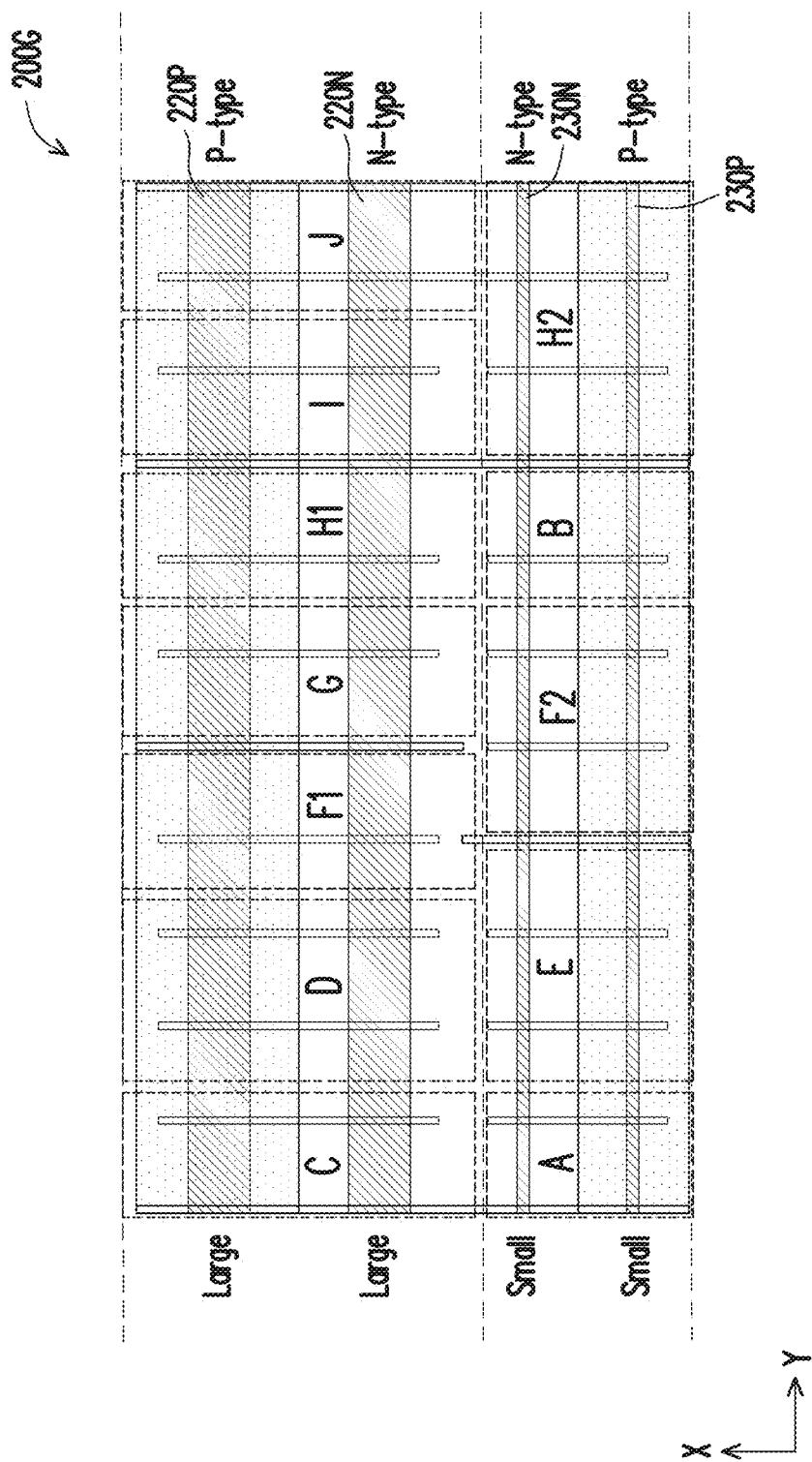

In the floor plans 200F-200G as shown in FIGS. 2F-2G, the two wide active-region structures (i.e., 220P and 220N) forms a first pair of adjacent active-region structures, and the two narrow active-region structures (i.e., 230P and 230N) forms a second pair of adjacent active-region structures. In the floor plan 200F of FIG. 2F, the wide PMOS active-region structure 220P is adjacent to the narrow PMOS active-region structure 230P, while the two PMOS active-region structures (i.e., 220P and 230P) are positioned between the wide NMOS active-region structure 220N and the narrow NMOS active-region structure 230N. In the floor plan 200G of FIG. 2G, the wide NMOS active-region structure 220N is adjacent to the narrow NMOS active-region structure 230N, while the two NMOS active-region structures (i.e., 220N and 230N) are positioned between the wide PMOS active-region structure 220P and the narrow PMOS active-region structure 230P.

In FIGS. 2A-2G, the gated inverter 110D, the transmission gate 110F1, the inverter 110G, the transmission gate 110H1, the inverter 110I, and the inverter 110J (which are all class-one devices) are constructed with wide transistors in the wide active-region structures (i.e., 220P and 220N). In addition, the gated inverter 110D, the transmission gate 110F1, the inverter 110G, the transmission gate 110H1, the inverter 110I, and the inverter 110J also form an ordered list arranged along the X-direction.

The order of the devices in the ordered list is determined by the direction of the data signal propagation. In the examples of FIGS. 2A-2G, the data signal propagates from the gated inverter 110D to the transmission gate 110F1, then from the transmission gate 110F1 to the inverter 110G, then from the inverter 110G to the transmission gate 110H1, then from the transmission gate 110H1 to the inverter 110I, and then from the inverter 110I to the inverter 110J. When the ordered list of the class-one devices is arranged along the X-direction, the X-coordinates of the class-one devices in the ordered list changes monotonously following the order of the class-one devices in the list. For example, in FIGS. 2A-2G, the X-coordinate of the gated inverter 110D is smaller than the X-coordinate of the transmission gate 110F1, the X-coordinates of the transmission gate 110F1 is smaller than the X-coordinate of the inverter 110G, the X-coordinates of the inverter 110G is smaller than the X-coordinate of the transmission gate 110H1, the X-coordinates of the transmission gate 110H1 is smaller than the X-coordinate of the inverter 110I, and the X-coordinates of the inverter 110I is smaller than the X-coordinate of the inverter 110J.

In some embodiments, the floor plans of FIGS. 2A-2G are modified to accommodate various variations of the integrated circuit 100 in FIG. 1. The clock gated input circuit 101 of FIG. 1 includes a transmission gate 110F1, a gated inverter 110D, and a gated inverter 110E, which forms a clock gated multiplexer. Other implementations of the clock gated input circuit are within the contemplated scope of the present disclosure. As a first example, in the integrated circuit 300A of FIG. 3A, the clock gated input circuit 101 is implemented as a gated inverter 110D serially connected with a transmission gate 110F1. As a second example, in the integrated circuit 300B of FIG. 3B, the clock gated input circuit 101 is implemented as an inverter 310D serially connected with a transmission gate 110F1. The inverter 310D and the transmission gate 110F1 forms a clocked inverter, which is used as the clock gated input circuit 101.

Figure 3A:
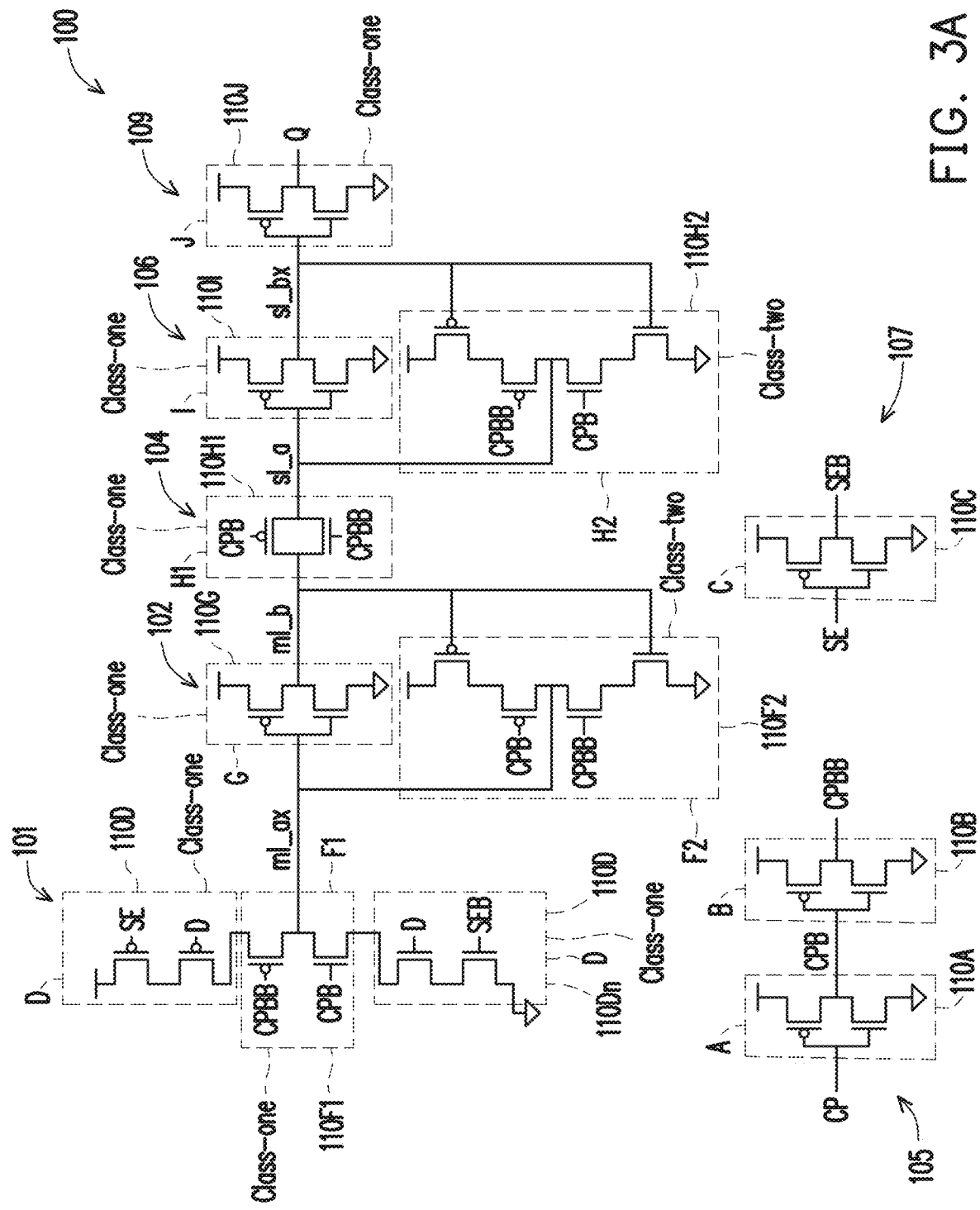
FIGS. 3A-3D are circuit diagrams of various variations of the integrated circuit in FIG. 1, in accordance with some embodiments.
Figure 3B:
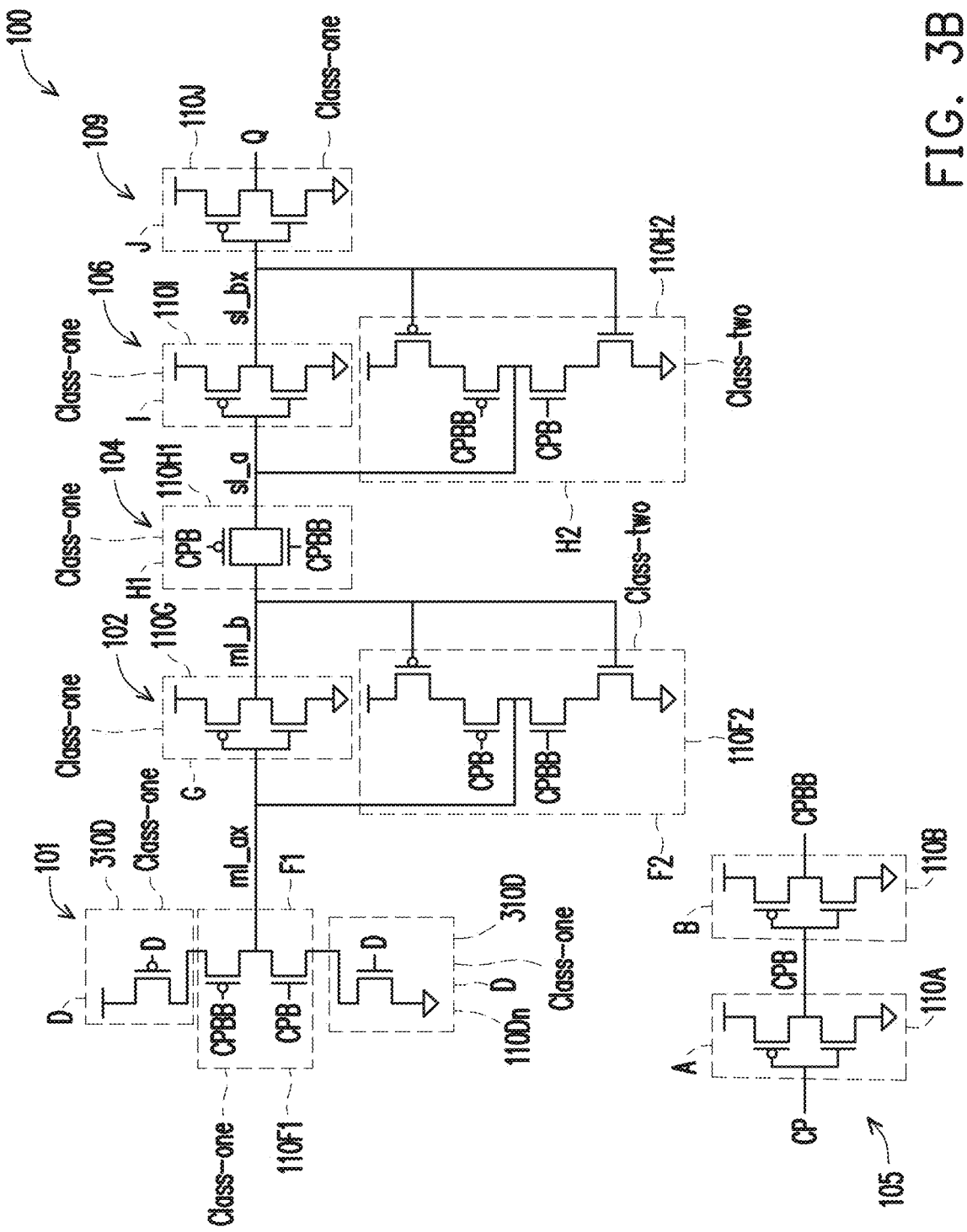

In some embodiments, the floor plan for the integrated circuit 300A of FIG. 3A or the integrated circuit 300B of FIG. 3A is obtained by modifying one of the floor plans in FIGS. 2A-2G. For example, in some embodiments, the modification of a floor plan in FIGS. 2A-2G includes removing the gated inverter 110E in the layout area "E." In some embodiments, after removing the gated inverter 110E in the layout area "E", one or more dummy deices are implemented in the layout area "E". In some alternative embodiments, after removing the gated inverter 110E in the layout area "E," one of the inverters 110A, 110B, and 110C which used to be implemented with the wide active-region structures (i.e., 220P and 220N) is moved to the layout area "E" and implemented with the narrow active-region structures (i.e., 230P and 230N). The modification of the floor plan 200A in FIG. 2A includes moving the inverter 110A to the layout area "E." The modification of the floor plan 200B in FIG. 2B includes moving the inverter 110B to the layout area "E." For the integrated circuit 300A of FIG. 3A, the modification of one of the floor plans 200C-200G in FIGS. 2C-2G includes moving the inverter 110C to the layout area "E." For the integrated circuit 300B of FIG. 3B, however, the modification includes removing the inverter 110C from the layout area "C." Other modifications of the floor plans of FIGS. 2A-2G for implementing the integrated circuit 300A or 300B are also within the contemplated scope of the present disclosure.

Figure 3C:
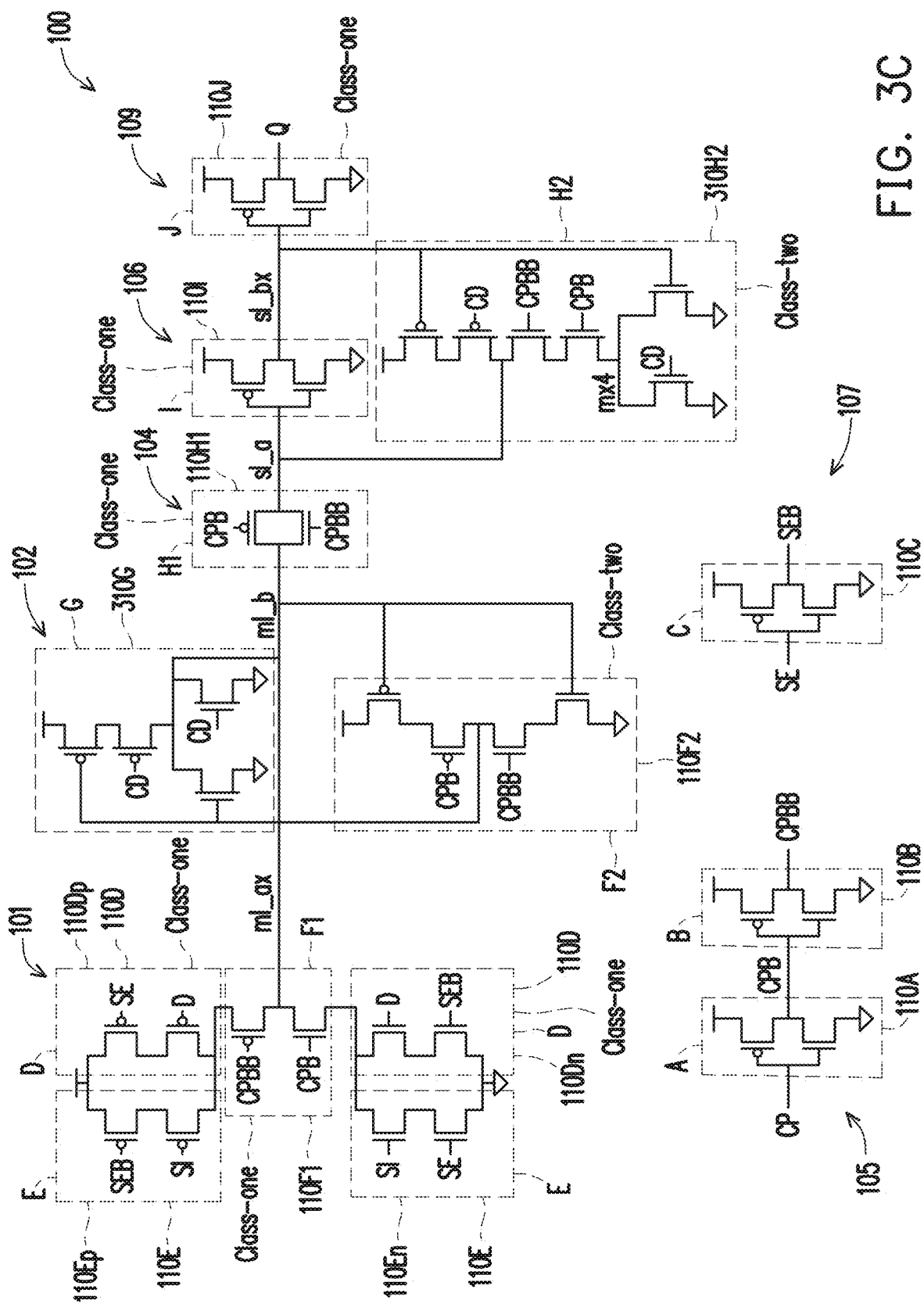

Another variation of the integrated circuit 100 in FIG. 1 is the integrated circuit 300C as shown in FIG. 3C. In the integrated circuit 300C, the inverter 110G in the master latch 102 of FIG. 1 is implemented as a resettable inverter 310G, and the clocked inverter 110H2 in the slave latch 106 of FIG. 1 is implemented as a resettable clocked inverter 310H2. A reset logic signal CD is coupled to each of the resettable inverter 310G and the resettable clocked inverter 310H2. When the reset logic signal CD is at logic LOW, the resettable inverter 310G in FIG. 3C functions the same as the inverter 110G in FIG. 1, and the resettable clocked inverter 310H2 in FIG. 3C functions the same as the clocked inverter 110H2 in FIG. 1. When the reset logic signal CD is at logic HIGH, however, the signal at the output node ml_b of the master latch 102 is driven to logic LOW, and the slave latch 106 is driven to the unlatched state. In addition, during the time period that the clock signal CPB is at logic LOW, the logic LOW at the output node ml_b passes through the transmission gate 110H1; then, the logic LOW at the input node sl_a of the slave latch 106 passes through both the inverters 110I and 110J. Consequently, the signal at the output Q of the output driver 109 is reset to logic LOW by the reset logic signal CD.

In some embodiments, the floor plan for the integrated circuit 300C of FIG. 3C is obtained by modifying one of the floor plans of FIGS. 2A-2G. For example, in some embodiments, the modification of a floor plan in FIGS. 2A-2G includes enlarging the layout area "G" along the X-direction to accommodate the newly added wide transistors in the resettable inverter 310G, and the modification also includes enlarging the layout area "H2" along the X-direction to accommodate the newly added narrow transistors in the resettable clocked inverter 310H2. Other modifications of the floor plans of FIGS. 2A-2G for implementing the integrated circuit 300C are also within the contemplated scope of the present disclosure.

Figure 3D:
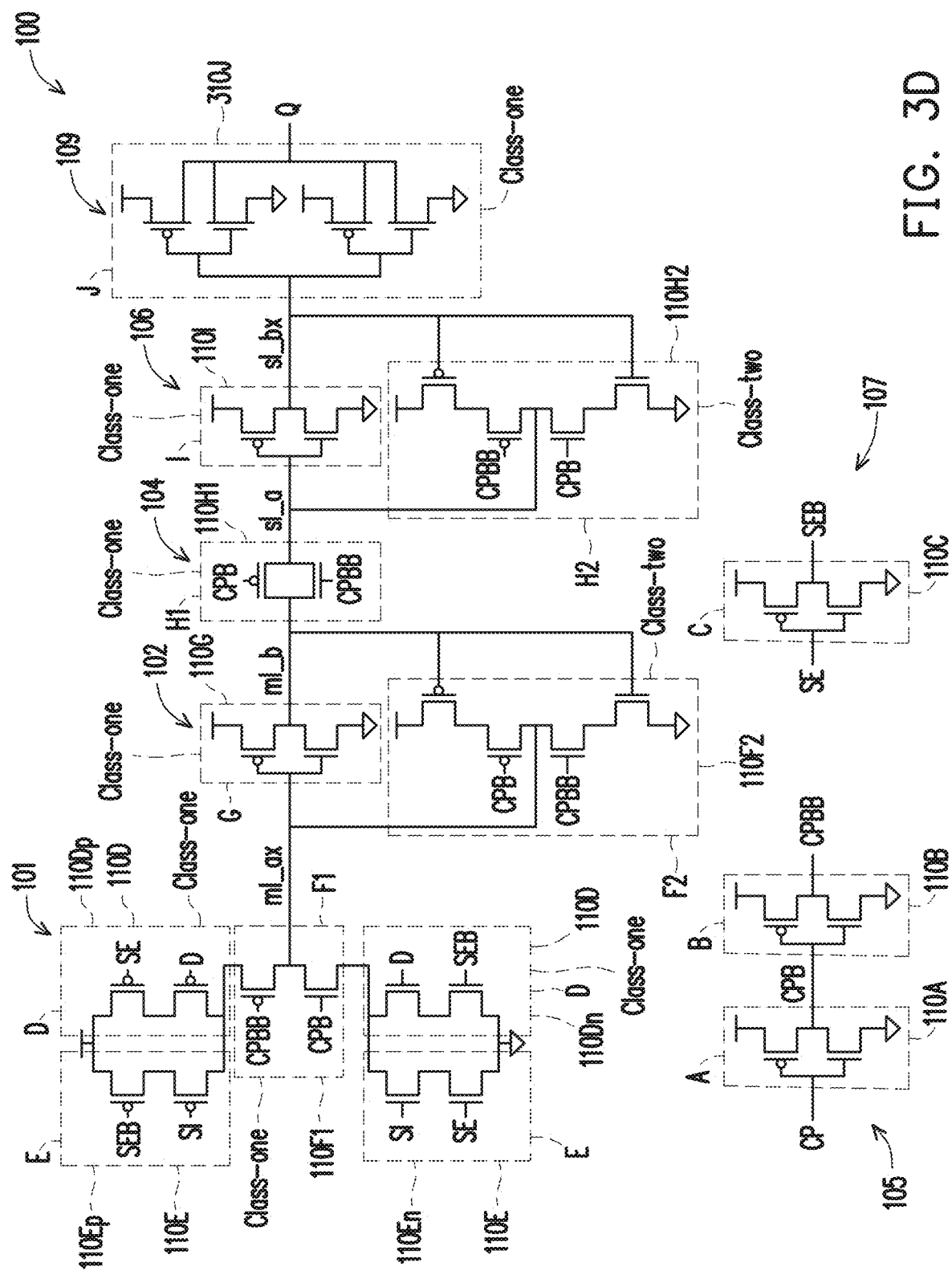

Still another variation of the integrated circuit 100 in FIG. 1 is the integrated circuit 300D as shown in FIG. 3D. In the integrated circuit 300D, the output driver 109 is implemented as an inverter 310J having two PMOS transistors and two NMOS transistors, whereby the driving strength of the output driver 109 is increased, as compared with an output driver that is implemented as an inverter having just one PMOS and one NMOS transistor. In some embodiments, to increase the driving strength of the output driver 109 further, more than two PMOS transistors and more than two NMOS transistors are used in the inverter for the output driver 109. Other variations of the output driver 109 are within the contemplated scope of the present disclosure. For example, in some embodiments, the output driver 109 is implemented as a buffer circuit, and the output signal of the buffer circuit and the input signal of the buffer circuit has the same logic value. In some embodiments, the floor plan for the integrated circuit 300D of FIG. 3D is obtained by modifying one of the floor plans of FIGS. 2A-2G. For example, in some embodiments, the modification of a floor plan in FIGS. 2A-2G includes enlarging the layout area "J" along the X-direction to accommodate the newly added wide transistors in the inverter 310J. Other modifications of the floor plans of FIGS. 2A-2G for implementing the integrated circuit 300D are also within the contemplated scope of the present disclosure.

Figure 4A:
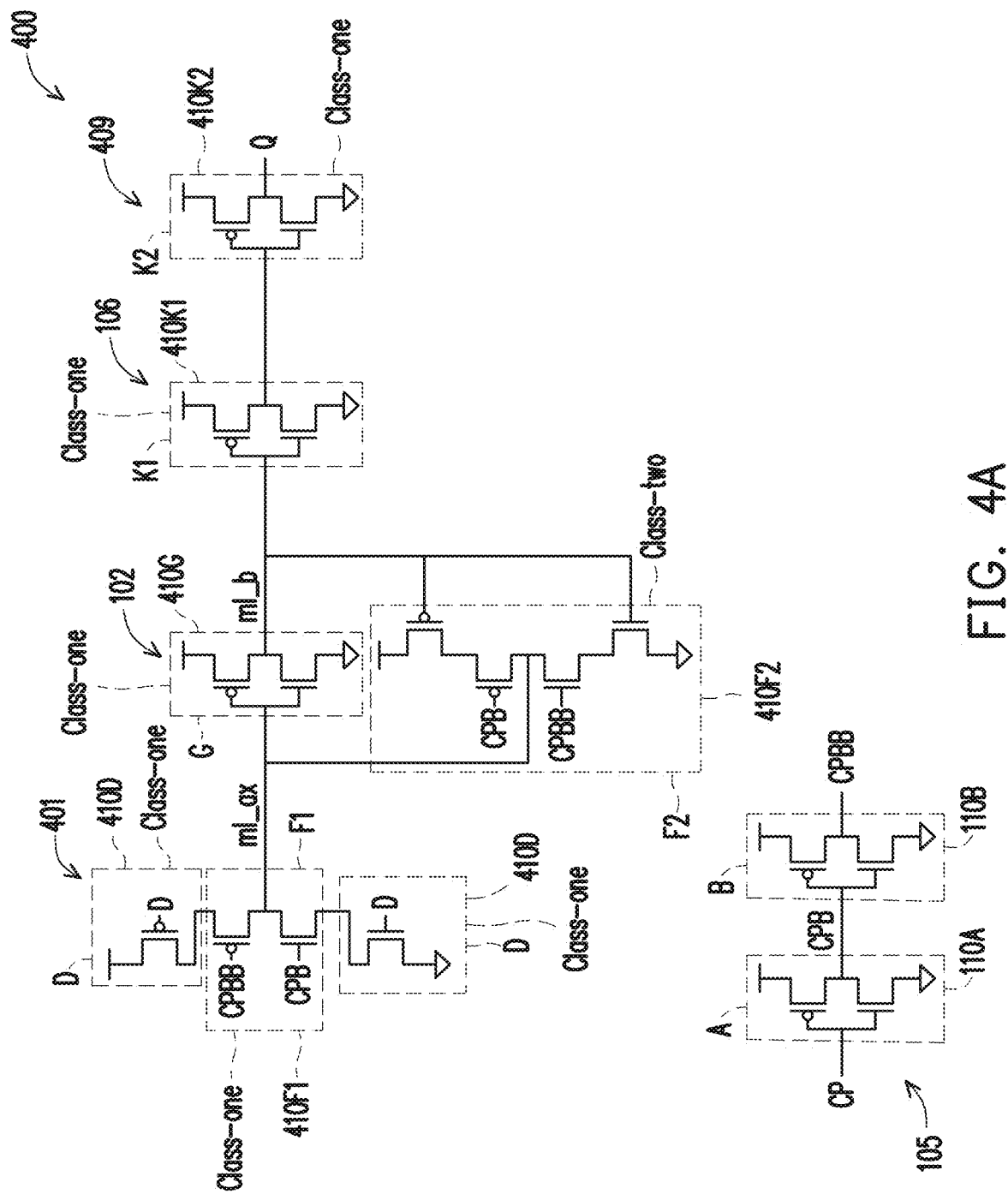
FIG. 4A is a circuit diagram of an integrated circuit having a data latch and a clock supporting circuit, in accordance with some embodiments.

In FIG. 1, the master-slave flip-flop is used as an example. In the master-slave flip-flop, class-one devices are constructed with wide transistors in wide active-region structures, and class-two devices are constructed with narrow transistors in narrow active-region structures. In the embodiment as shown in FIG. 4A, a data latch is used as another example. In the data latch, class-one devices are constructed with wide transistors in wide active-region structures, and a class-two device is constructed with narrow transistors in narrow active-region structures.

FIG. 4A is a circuit diagram of an integrated circuit 400 having a data latch and a clock supporting circuit, in accordance with some embodiments. The data latch includes an inverter 410D, a transmission gate 410F1, an inverter 410G, a clocked inverter 410F2, an inverter 410K1, and an inverter 410K2. The clock supporting circuit 105, implemented with two inverters 110A and 110B, receives a clock signal CP and generates an inverted clock signal CPB and an in-phase clock signal CPBB. The inverter 410D and the transmission gate 410F1 are connected as a clocked inverter, forming a clock gated input circuit 401. The inverter 410K1 and the inverter 410K2 forms an output driver 409. Each of the inverter 410G and the clocked inverter 410F2 is coupled between the clock gated input circuit 401 and the output driver 409. The output of the inverter 410G is connected to the input of the clocked inverter 410F2, while the output of the clocked inverter 410F2 is connected to the input of the inverter 410G.

Each of the transmission gate 410F1 and the clocked inverter 410F2 is driven by the clock signals CPB and CPBB. When the inverted clock signal CPB is at logic HIGH (and the in-phase clock signal CPBB is at logic LOW), the inverse of the data signal D is transmitted to the input (i.e., the node ml_ax) of the inverter 410G, and the logic value at the output (i.e., the node ml_b) of the inverter 410G is the same as the logic value of the data signal D, because the clocked inverter 410F2 is disabled by the clock signals CPB and CPBB. Thereafter, when the inverted clock signal CPB is change to logic LOW (and the in-phase clock signal CPBB is change to logic HIGH), the logic value at the output (i.e., the node ml_b) of the inverter 410G is latched by the clocked inverter 410F2 because the clocked inverter 410F2 is enabled by the clock signals CPB and CPBB. Furthermore, during the time period that the clock signal CPB at logic LOW (and the in-phase clock signal CPBB is at logic HIGH), the transmission gate 410F1 also prevents the data signal D from transmitting to the input (i.e., the node ml_ax) of the inverter 410G. The logic value at the output (i.e., the node ml_b) of the inverter 410G is transmitted to the output of the inverter 410K2 as the latched output signal Q.

Figure 4B:
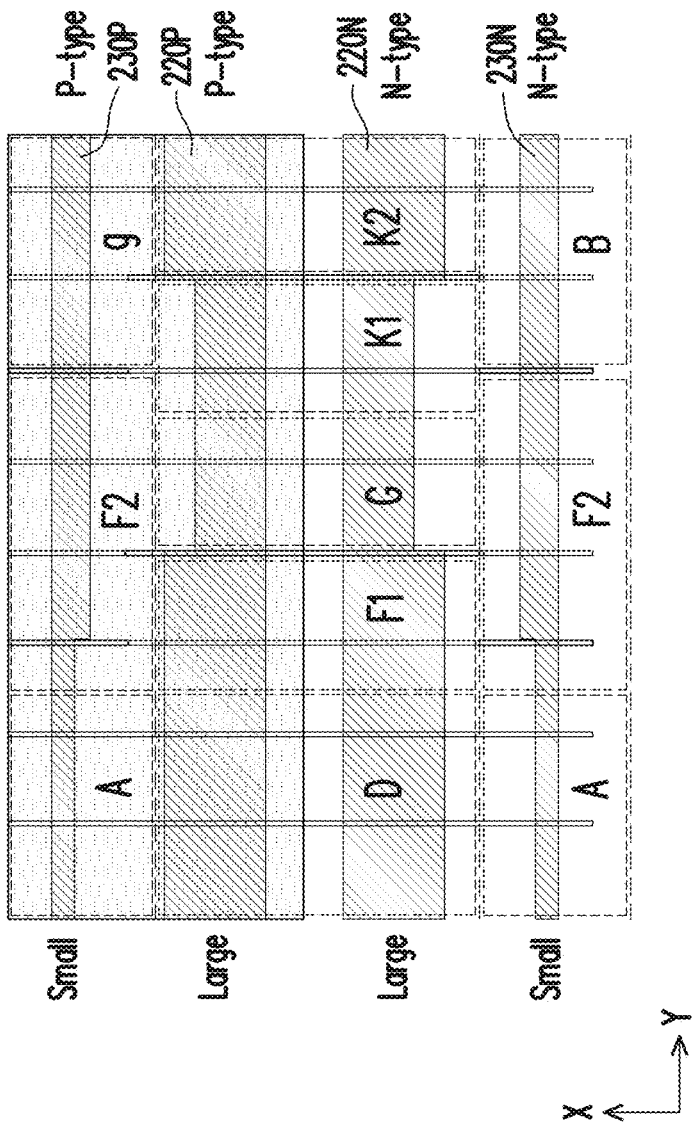
FIG. 4B is a floor plan of the integrated circuit of FIG. 4A, in accordance with some embodiments.

FIG. 4B is a floor plan of the integrated circuit 400 of FIG. 4A, in accordance with some embodiments. In FIG. 4B, each of the wide PMOS active-region structure 220P, the wide NMOS active-region structure 220N, the narrow PMOS active-region structure 230P, and the narrow NMOS active-region structure 230N extends in the X-direction. The inverter 410D, the transmission gate 410F1, the inverter 410G, the inverter 410K1, and the inverter 410K2 are implemented correspondingly in layout areas "D", "F1", "G", "K1", and "K2", while the inverter 110A, the clocked inverter 410F2, the inverter 110B are implemented correspondingly in layout areas "A", "F2", and "B". Each of the inverter 410D, the transmission gate 410F1, the inverter 410G, the inverter 410K1, and the inverter 410K2 is implemented as a class-one device which is constructed with wide transistors in the wide active-region structures (i.e., 220P and 220N), while the clocked inverter 410F2 is implemented as a class-two device which is constructed with narrow transistors in the narrow active-region structures (i.e., 230P and 230N). In FIG. 4B, each of the inverters 110A and 110B is also constructed with narrow transistors in the narrow active-region structures (i.e., 230P and 230N). In addition, as shown by the order of the layout areas "D", "F1", "G", "K1", and "K2", an ordered list of the inverter 410D, the transmission gate 410F1, the inverter 410G, the inverter 410K1, and the inverter 410K2 is arranged along the X-direction in the floor plan.

The floor plan in FIG. 4B is provided as an example, various variations of the floor plans in FIGS. 2A-2G adapted for the integrated circuit 400 of FIG. 4A are within the contemplated scope of the present disclosure. Other implementations of the floor plan for the integrated circuit 400 of FIG. 4A are also within the contemplated scope of the present disclosure.

In some embodiments, the integrated circuit 100 in FIG. 1 is designed as a circuit cell based on the floor plans in FIGS. 2A-2G. In some embodiments, the integrated circuit 400 of FIG. 4A is designed as a circuit cell based on the floor plan in FIG. 4B. The circuit cell of the integrated circuit 100 or the integrated circuit 400 is often placed in a larger multi-cell integrated circuit that has other single-height circuit cells. In the larger multi-cell integrated circuit, most of the logic gates (such as NOT gates, NOR gates, and NAND gates) are implemented as single-height circuit cells, while the integrated circuit 100 or the integrated circuit 400 is implemented as a double-height circuit cell or a triple-height circuit cell.

FIGS. 5A-5E are floor plans of a multi-cell integrate circuit that includes multiple single-height circuit cells and a multiple-height circuit cell having the integrated circuit 100 of FIG. 1, in accordance with some embodiments. In FIGS. 5A-5E, a circuit cell 500 occupying multiple cell-rows is placed between two cell rows 510 and 520. The cell row 510 is identified as between horizontal lines 501 and 503, and the cell row 520 is identified as between horizontal lines 502 and 504. Along the cell row 510 extending in the X-direction, multiple single-height circuit cells (not all shown in the figure) are aligned between the horizontal lines 501 and 503, and one of the single-height circuit cells is identified as the single-height circuit 514. The single-height circuit 514 is implemented in the layout area "U" in each of the floor plans. Along the cell row 520 extending in the X-direction, multiple single-height circuit cells (not all shown in the figure) are aligned between the horizontal lines 502 and 504, and one of the single-height circuit cells is identified as the single-height circuit 524. The single-height circuit 524 is implemented in the layout area "V" in each of the floor plans. The cell height of each cell is measured along the Y-direction in the unit of "CH". The Y-direction is perpendicular to the X-direction.

Figure 5A:
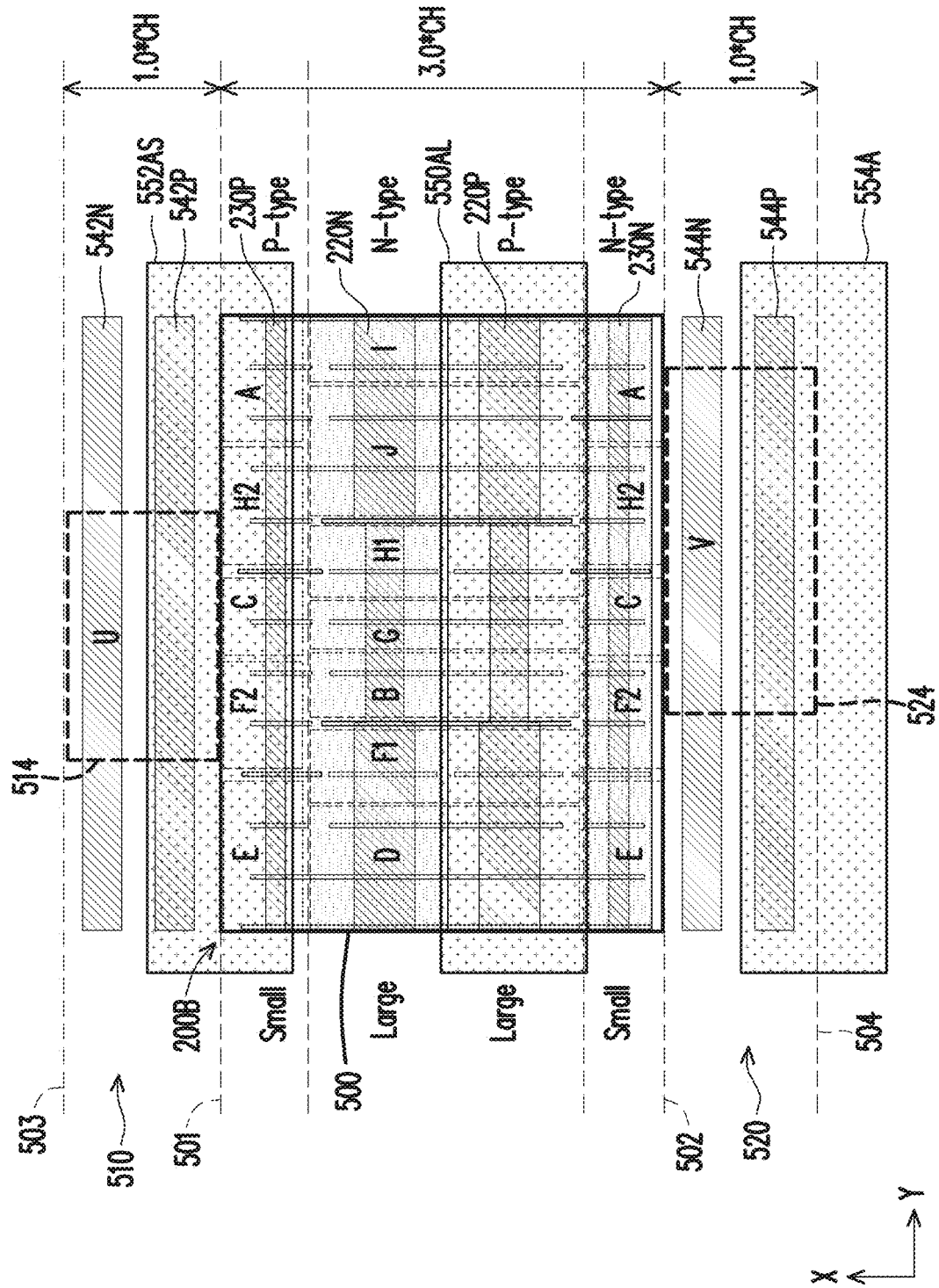
FIGS. 5A-5E are floor plans of a multi-cell integrate circuit that includes multiple single-height circuit cells and a multiple-height circuit cell having the integrated circuit of FIG. 1, in accordance with some embodiments.

Each of the single-height circuit 514 and the single-height circuit 524 has a cell height that is equal to 1.0*CH. The circuit cell 500 (which is implemented with the integrated circuit 100 of FIG. 1) is bounded between the horizontal lines 501 and 502. In FIG. 5A, the circuit cell 500 has a cell height that is equal to 3.0*CH. In FIGS. 5B-5E, the circuit cell 500 has a cell height that is equal to 2.0*CH.

In FIGS. 5A-5E, the circuit cells in the cell row 510 are constructed with PMOS transistors in the PMOS active-region structure 542P and NMOS transistors in the NMOS active-region structure 542N. The circuit cells in the cell row 520 are constructed with PMOS transistors in the PMOS active-region structure 544P and NMOS transistors in the NMOS active-region structure 544N. The PMOS active-region structures 542P and 544P and the NMOS active-region structures 542N and 544N, which extend in the X-direction, are all in parallel with the wide active active-region structures (i.e., 220P and 220N) and the narrow active active-region structures (i.e., 230P and 230N).

The circuit cell 500 in FIGS. 5A-5E is implemented with the integrated circuit 100 of FIG. 1. Each floor plan of the circuit cell 500 in FIGS. 5A-5E corresponds to one of the floor plans in FIGS. 2B-2C and 2E-2G. In some embodiments, the NMOS active-region structures (i.e., 220N, 230N, 542N and 544N) are fabricated in a p-type substrate, and the PMOS active-region structures (i.e., 220P, 230P, 542P and 544P) are fabricated in n-type wells in the p-type substrate.

In FIG. 5A, the circuit cell 500 has a floor plan that is the same as the floor plan 200B in FIG. 2B, floor plan 200B has already been described with reference to FIG. 2B. In FIG. 5A, the PMOS active-region structure 542P and the narrow PMOS active-region structure 230P are fabricated in n-type well 550AS, the wide PMOS active-region structure 220P is fabricated in n-type wells 550AL, and the PMOS active-region structure 544P is fabricated in n-type well 554A. In some embodiments, the n-type wells 550AS, 550AL, and 554A are equally spaced along the Y-direction.

Figure 5B:
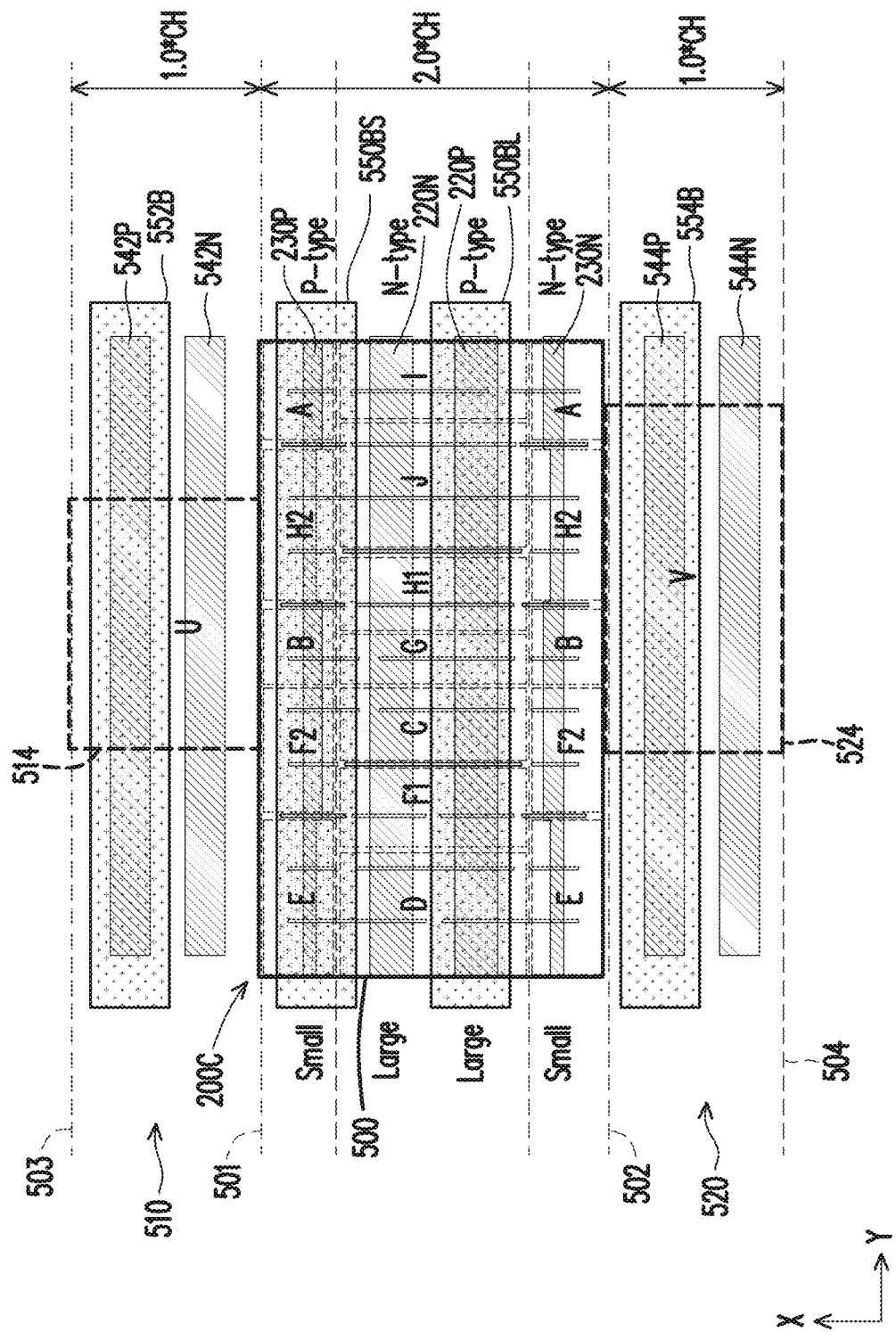

In FIG. 5B, the circuit cell 500 has a floor plan that is the same as the floor plan 200C in FIG. 2C, and the floor plan 200C has already been described with reference to FIG. 2C. In FIG. 5B, the wide PMOS active-region structure 220P and the narrow PMOS active-region structure 230P are correspondingly fabricated in n-type wells 550BL and 550BS, while the PMOS active-region structures 542P and 544P are correspondingly fabricated in n-type wells 552B and 554B. In some embodiments, the n-type wells 552B, 550BS, 550BL, and 554B are equally spaced along the Y-direction.

Figure 5C:
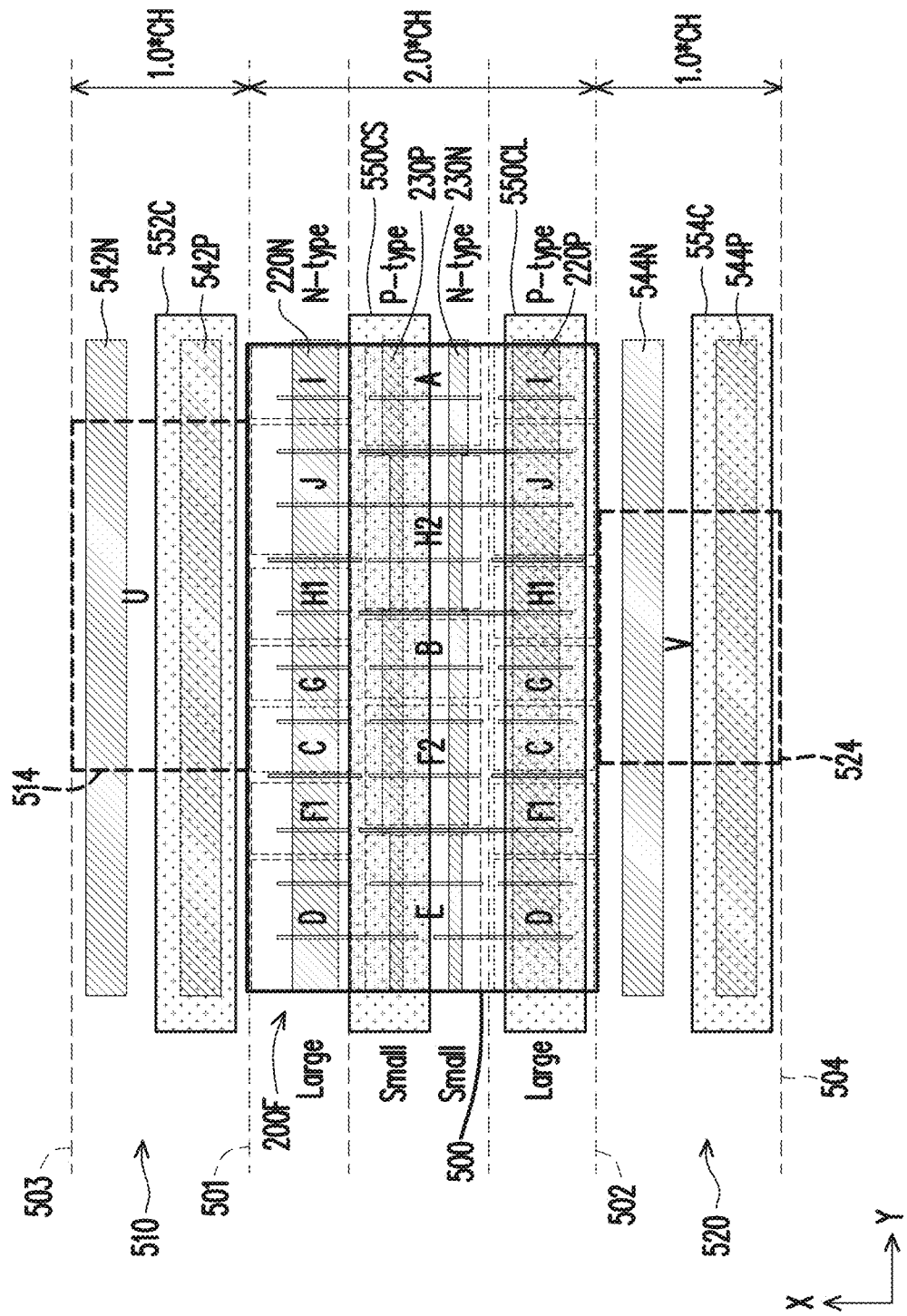

In FIG. 5C, the circuit cell 500 has a floor plan that is the same as the floor plan 200E in FIG. 2E, and the floor plan 200E has already been described with reference to FIG. 2E. In FIG. 5C, the wide PMOS active-region structure 220P and the narrow PMOS active-region structure 230P are correspondingly fabricated in n-type wells 550CL and 550CS, while the PMOS active-region structures 542P and 544P are correspondingly fabricated in n-type wells 552C and 554C. In some embodiments, the n-type wells 552C, 550CS, 550CL, and 554C are equally spaced along the Y-direction.

Figure 5D:
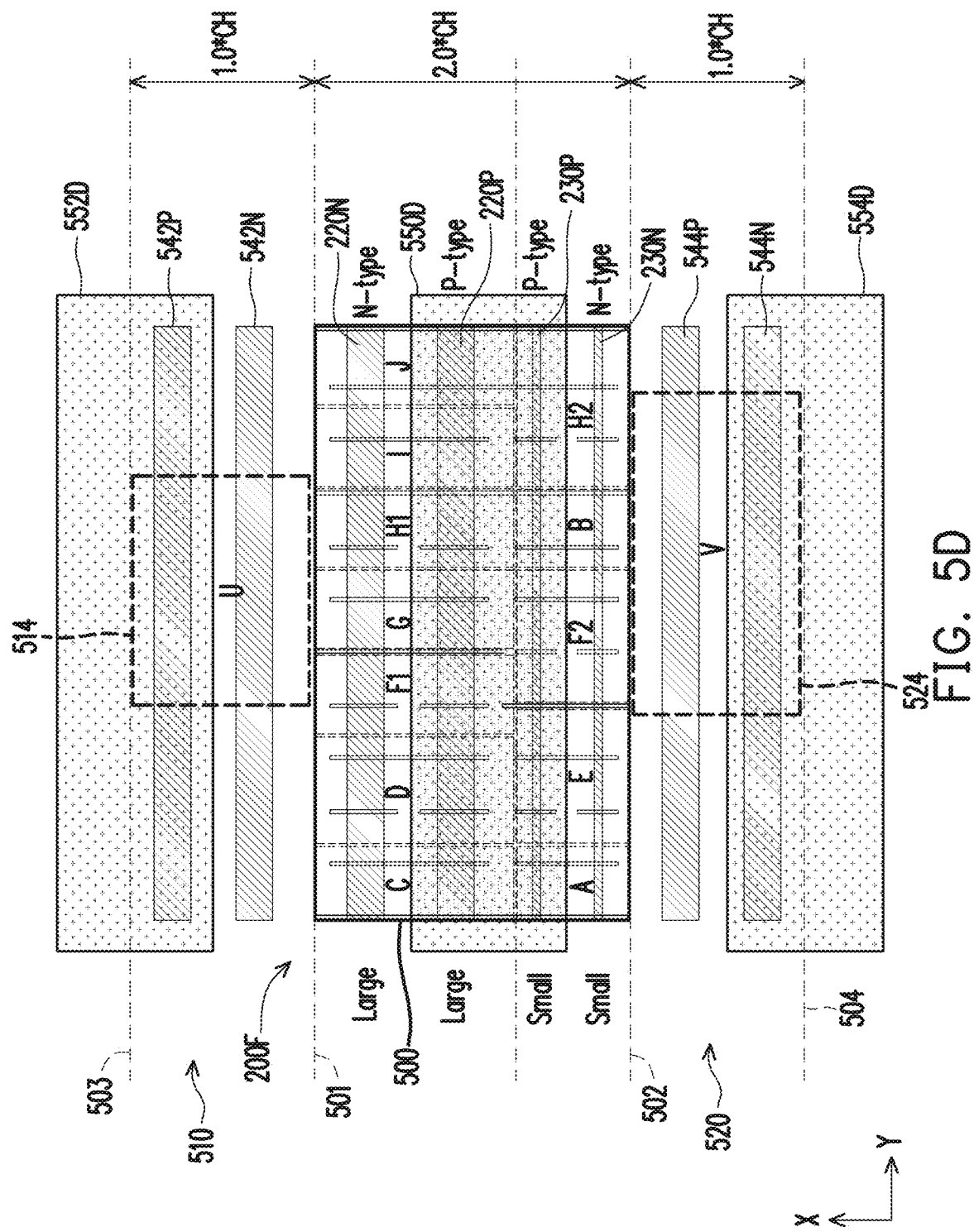

In FIG. 5D, the circuit cell 500 has a floor plan that is the same as the floor plan 200F in FIG. 2F, and the floor plan 200F has already been described with reference to FIG. 2F. In FIG. 5D, the wide PMOS active-region structure 220P and the narrow PMOS active-region structure 230P are fabricated in n-type well 550D, while the PMOS active-region structures 542P and 544P are correspondingly fabricated in n-type wells 552D and 554D. In some embodiments, the n-type wells 552D, 550D, and 554D are equally spaced along the Y-direction.

Figure 5E:
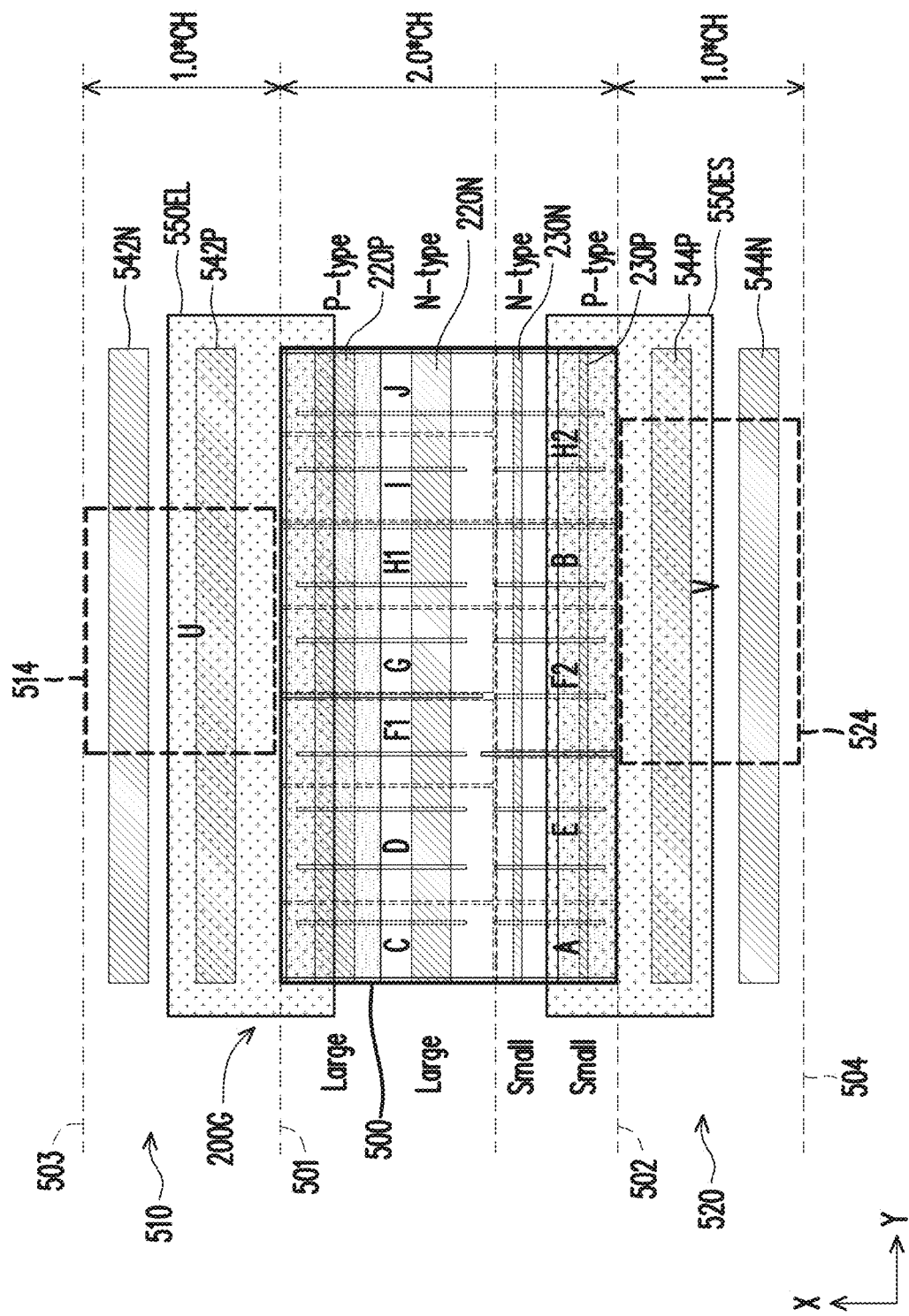

In FIG. 5E, the circuit cell 500 has a floor plan that is the same as the floor plan 200G in FIG. 2G, and the floor plan 200G has already been described with reference to FIG. 2G. In FIG. 5E, the wide PMOS active-region structure 220P and the narrow PMOS active-region structure 230P are correspondingly fabricated in n-type wells 550EL and 550ES. In the n-type wells 550EL and 550ES, the PMOS active-region structures 542P and 544P are also correspondingly fabricated. In some embodiments, the n-type wells 550EL and 550ES and the adjacent n-type wells (not shown in the figure) are equally spaced along the Y-direction.

In FIG. 1, the gated inverter 110D, the transmission gate 110F1, the inverter 110G, the transmission gate 110H1, the inverter 110I, and the inverter 110J are all on the forward data path of the flip-flop circuit. In FIGS. 2A-2G, each of the devices on the forward data path is implemented as a class-one device constructed with transistors in the wide active-region structures (i.e., 220P and 220N). Additionally, FIGS. 2A-2G, the gated inverter 110D, the transmission gate 110F1, the inverter 110G, the transmission gate 110H1, the inverter 110I, and the inverter 110J are arranged in the floor plan along the X-direction as an ordered list following the forward data path of the flip-flop circuit. When the flip-flop circuit is implemented based on one of the floor plans as shown in FIGS. 2A-2G, the setup slack time at the second transmission gate H1 of the flip-flop circuit is improved, as compared with some alternative implementations in which some devices on the forward data path are not implemented as class-one devices. When the flip-flop circuit is implemented based on one of the floor plans as shown in FIGS. 2A-2G, the setup slack time at the second transmission gate H1 of the flip-flop circuit is also improved, as compared with some alternative implementations in which the gated inverter 110D, the transmission gate 110F1, the inverter 110G, the transmission gate 110H1, the inverter 110I, and the inverter 110J are not arranged as an ordered list following the forward data path.

Figure 6:
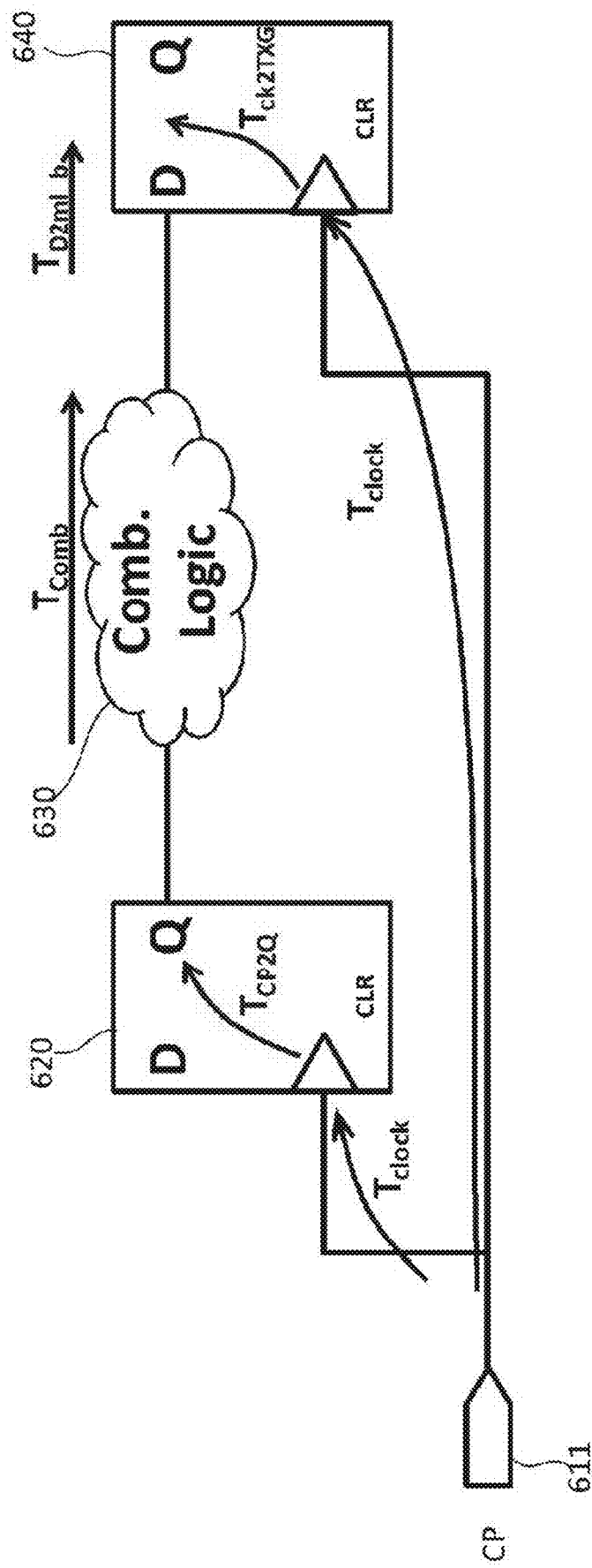
FIG. 6 is a circuit diagram of flip-flop circuits in using with a combination logic circuit, in accordance with some embodiments.

When the flip-flop circuits are used with a combination logic circuit, the setup slack time is related to the time delay of the gated inverter 110D, the transmission gate 110F1, the inverter 110G, the transmission gate 110H1, the inverter 110I, and the inverter 110J on the forward data path. FIG. 6 is a circuit diagram of flip-flop circuits in using with a combination logic circuit, in accordance with some embodiments. The circuit in FIG. 6 includes flip-flop circuits 620 and 640 and a combination logic circuit 630 coupled between the flip-flop circuits 620 and 640. Each of the flip-flop circuits 620 and 640 is implemented as an instance of the flip-flop circuit in FIG. 1, and each of the flip-flop circuits 620 and 640 receives a clock signal CP from a clock input node 611. In FIG. 6, the data signal received at the input D of the flip-flop circuit 620 at the instant of a triggering edge of the clock signal CP is transmitted to the output Q of the flip-flop circuit 620. Subsequently, the data signal at the output Q of the flip-flop circuit 620 passes through the combination logic circuit 630 and arrives at the input D of the flip-flop circuit 640. Then, the data signal at the input D of the flip-flop circuit 640 is transmitted to the transmission gate 110H1 (as shown in FIG. 1) within the flip-flop circuit, which is to be latched by the slave latch 106 (as shown in FIG. 1).

In FIG. 6, the arrival time $T_{arr}$ of the data at the input of the transmission gate 110H1 in the flip-flop circuit 640 is given by the equation $T_{arr}=T_{clock}+T_{CP2Q}+T_{comb}+T_{D2ml\_b}$, where $T_{clock}$ is the time of the triggering edge of the clock signal CP, $T_{CP2Q}$ is the delay time from the triggering input of the flip-flop circuit 620 to the output Q of the flip-flop circuit 620, $T_{comb}$ is the delay time of the combination logic circuit 630, and $T_{D2ml\_b}$ is the delay time from the input D of the flip-flop circuit 640 to input of the transmission gate 110H1 in the flip-flop circuit 640. The data required time Treg of the data at the input of the transmission gate 110H1 in the flip-flop circuit 640 is given by the equation $T_{req}=T_{clock}+T_{ck2TXG}$, where $T_{ck2TXG}$ is the delay time from the triggering input of the flip-flop circuit 640 to the input of the transmission gate 110H1 in the flip-flop circuit 640. The setup slack time at the input of the transmission gate 110H1 is the difference between the required time $T_{req}$ and the arrival time $T_{arr}$ of the data at the input of the transmission gate 110H1. When the flip-flop circuits 620 and 640 are implemented with one of the floor plans in FIGS. 2A-2G, each of the delay time $T_{CP2Q}$ and the delay time $T_{D2ml\_b}$ decreases, which results in an improvement of the setup slack time at the input of the transmission gate 110H1. Additionally, when the flip-flop circuit 640 is implemented with one of the floor plans in FIGS. 2C-2G, the delay time $T_{ck2TXG}$ also increases, which leads to a further improvement of the setup slack time at the input of the transmission gate 110H1.

Figure 7:
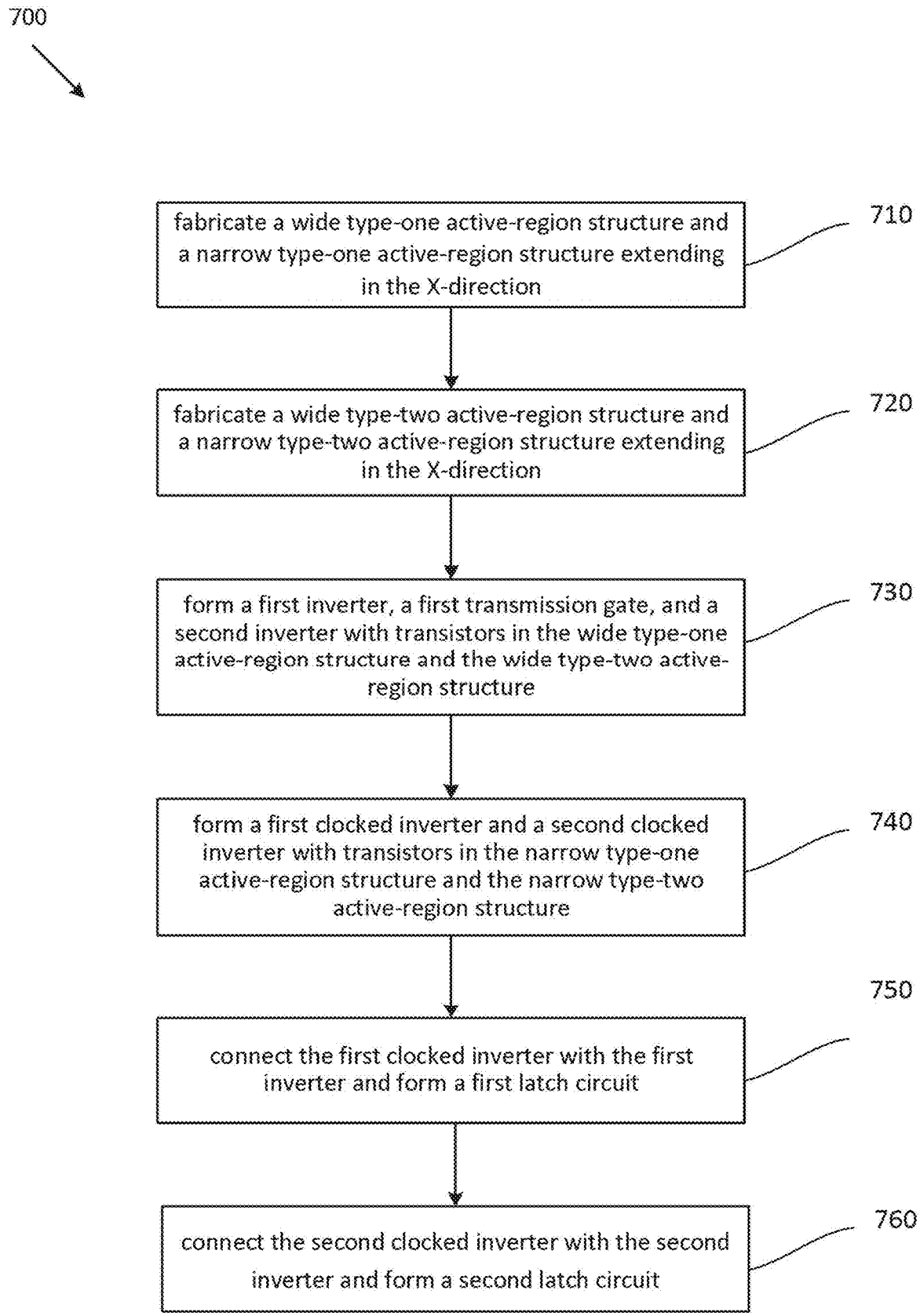
FIG. 7 is a flowchart of a method of fabricating an integrated circuit, in accordance with some embodiments.

FIG. 7 is a flowchart of a method 700 of fabricating an integrated circuit, in accordance with some embodiments. The sequence in which the operations of method 700 are depicted in FIG. 7 is for illustration only; the operations of method 700 are capable of being executed in sequences that differ from that depicted in FIG. 7. It is understood that additional operations may be performed before, during, and/or after the method 700 depicted in FIG. 7, and that some other processes may only be briefly described herein.

In operation 710 of method 700, a wide type-one active-region structure and a narrow type-one active-region structure extending in the X-direction are fabricated. In operation 720 of method 700, a wide type-two active-region structure and a narrow type-two active-region structure extending in the X-direction are fabricated. In the example embodiments as shown in FIGS. 2A-2G and FIGS. 3A-3E, the wide PMOS active-region structure 220P and the narrow PMOS active-region structure 230P are fabricated in operation 710 (or alternatively in operation 720), and the wide NMOS active-region structure 220N and the narrow NMOS active-region structure 230N are fabricated in operation 720 (or alternatively in operation 710). In addition, in the example embodiments as shown in FIGS. 3A-3E, the PMOS active-region structures 542P and 544P are fabricated in operation 710 (or alternatively in operation 720), and the NMOS active-region structures 542N and 544N are fabricated in operation 720 (or alternatively in operation 710). After operations 710 and 720, the fabrication process proceeds to operation 730 and 740.

In operation 730 of method 700, a first inverter, a first transmission gate, and a second inverter are formed with wide type-one transistors in the wide type-one active-region structure and wide type-two transistors in the wide type-two active-region structure. In the example embodiments as shown in FIGS. 2A-2G and FIGS. 3A-3E, the inverter 110G, the transmission gate 110H1, and the inverter 110I are formed with wide PMOS transistors in the wide PMOS active-region structure 220P and wide NMOS transistors the wide NMOS active-region structure 220N. In operation 740 of method 700, a first clocked inverter and a second clocked inverter are formed with narrow type-one transistors in the narrow type-one active-region structure and narrow type-two transistors in the narrow type-two active-region structure. In the example embodiments as shown in FIGS. 2A-2G and FIGS. 3A-3E, the clocked inverter 110F2 and the clocked inverter 110H2 are formed with narrow PMOS transistors in the narrow PMOS active-region structure 230P and narrow NMOS transistors in the narrow NMOS active-region structure 230N. After operations 710 and 720, the fabrication process proceeds to operation 750 and 760.

In operation 750 of method 700, the first clocked inverter is connected with the first inverter, whereby a first latch circuit is formed. In the example embodiments as shown in FIGS. 2A-2G and FIGS. 3A-3E, the output of the inverter 110G is connected to the input of the clocked inverter 110F2, and the output of the clocked inverter 110F2 is connected to the input of the inverter 110G, whereby the master latch 102 is formed. In operation 760 of method 700, the second clocked inverter is connected with the second inverter, whereby a second latch circuit is formed. In the example embodiments as shown in FIGS. 2A-2G and FIGS. 3A-3E, the output of the inverter 110I is connected to the input of the clocked inverter 110H2, and the output of the clocked inverter 110H2 is connected to the input of the inverter 110I, whereby the slave latch 106 is formed.

In some embodiments, at least some portions of the wide active-region structures and the narrow active-region structures fabricated in operation 710 and operation 720 have uniform widths along the Y-direction. For example, in the floor plans in FIGS. 2F-2G, each of the width of the wide PMOS active-region structure 220P and the width of the wide NMOS active-region structure 220N within at least the layout areas D, F1, G, H1, I, J for implementing the class-one devices remains uniformly the same, each of the width of the narrow PMOS active-region structure 230P and the width of the narrow NMOS active-region structure 230N within at least the layout areas F2 and H2 for implementing the class-two devices also remains uniformly the same. In FIGS. 2F-2G, the uniform width (or the average width) of the wide PMOS active-region structure 220P is large than the uniform width (or the average width) of the narrow PMOS active-region structure 230P, and the uniform width of the wide NMOS active-region structure 220N is large than the uniform width (or the average width) of the narrow NMOS active-region structure 230N.

In some alternative embodiments, some portions of the wide active-region structures and the narrow active-region structures fabricated in operation 710 and operation 720 do not have uniform widths along the Y-direction. In some floor plans in FIGS. 2A-2E, the widths of the wide PMOS active-region structure 220P and the widths of the wide NMOS active-region structure 220N within some of the layout areas D, F1, G, H1, I, J for implementing the class-one devices are individually adjusted to further improve the slack time of the flip flop in FIG. 1. In some floor plans in FIGS. 2A-2E, the widths of the narrow PMOS active-region structure 230P and the widths of the narrow NMOS active-region structure 230N within some of the layout areas F2 and H2 for implementing the class-two devices are individually adjusted.

As an example, in the embodiments as shown in FIGS. 2B and 2D, the widths of the wide PMOS active-region structure 220P within the layout areas D, F1, G, H1, I, J are not uniformly the same, and the widths of the widths of the wide NMOS active-region structure 220N within the layout areas D, F1, G, H1, I, J are not uniformly the same, even though each of the width of the narrow PMOS active-region structure 230P and the width of the narrow NMOS active-region structure 230N within the layout areas F2 and H2 for implementing the class-two devices remains uniformly the same. In FIGS. 2B and 2D, the average width of the wide PMOS active-region structure 220P is still large than the uniform width (or the average width) of the narrow PMOS active-region structure 230P within the layout areas F2 and H2, and average width of the wide NMOS active-region structure 220N is still large than the uniform width (or the average width) of the narrow NMOS active-region structure 230N within the layout areas F2 and H2. Consequently, the average gate width of the wide PMOS transistors in the class-one devices is larger than the average gate width of the narrow PMOS transistors in the class-two devices, the average gate width of the wide NMOS transistors in the class-one devices is larger than the average gate width of the narrow NMOS transistors in the class-two devices.

As an example, in the embodiments as shown in FIGS. 2C and 2E, the widths of the narrow PMOS active-region structure 230P within the layout areas F2 and H2 are not uniformly the same, and the widths of the narrow NMOS active-region structure 230N within the layout areas F2 and H2 are not uniformly the same, even though each of the width of the wide PMOS active-region structure 220P and the width of the wide NMOS active-region structure 220N within the layout areas D, F1, G, H1, I, J for implementing the class-one devices remains uniformly the same. In FIGS. 2C and 2E, the uniform width (or the average width) of the wide PMOS active-region structure 220P is still large than the average width of the narrow PMOS active-region structure 230P within the layout areas F2 and H2, and uniform width (or the average width) of the wide NMOS active-region structure 220N is still large than the average width of the narrow NMOS active-region structure 230N within the layout areas F2 and H2. Consequently, the average gate width of the wide PMOS transistors in the class-one devices is larger than the average gate width of the narrow PMOS transistors in the class-two devices, the average gate width of the wide NMOS transistors in the class-one devices is larger than the average gate width of the narrow NMOS transistors in the class-two devices.

As an example, in the embodiments as shown in FIG. 2A, the widths of the wide PMOS active-region structure 220P within the layout areas D, F1, G, H1, I, J are not uniformly the same, and the widths of the widths of the wide NMOS active-region structure 220N within the layout areas D, F1, G, H1, I, J are not uniformly the same, the widths of the narrow PMOS active-region structure 230P within the layout areas F2 and H2 are not uniformly the same, and the widths of the narrow NMOS active-region structure 230N within the layout areas F2 and H2 are not uniformly the same. In FIG. 2A, the average width of the wide PMOS active-region structure 220P within the layout areas D, F1, G, H1, I, J for implementing the class-one devices is still large than the average width of the narrow PMOS active-region structure 230P within the layout areas F2 and H2 for implementing the class-two devices, and the average width of the wide NMOS active-region structure 220N within the layout areas D, F1, G, H1, I, J for implementing the class-one devices is large than the average width of the narrow NMOS active-region structure 230N within the layout areas F2 and H2 for implementing the class-two devices. Consequently, the average gate width of the wide PMOS transistors in the class-one devices is larger than the average gate width of the narrow PMOS transistors in the class-two devices, the average gate width of the wide NMOS transistors in the class-one devices is larger than the average gate width of the narrow NMOS transistors in the class-two devices.

Figure 8:
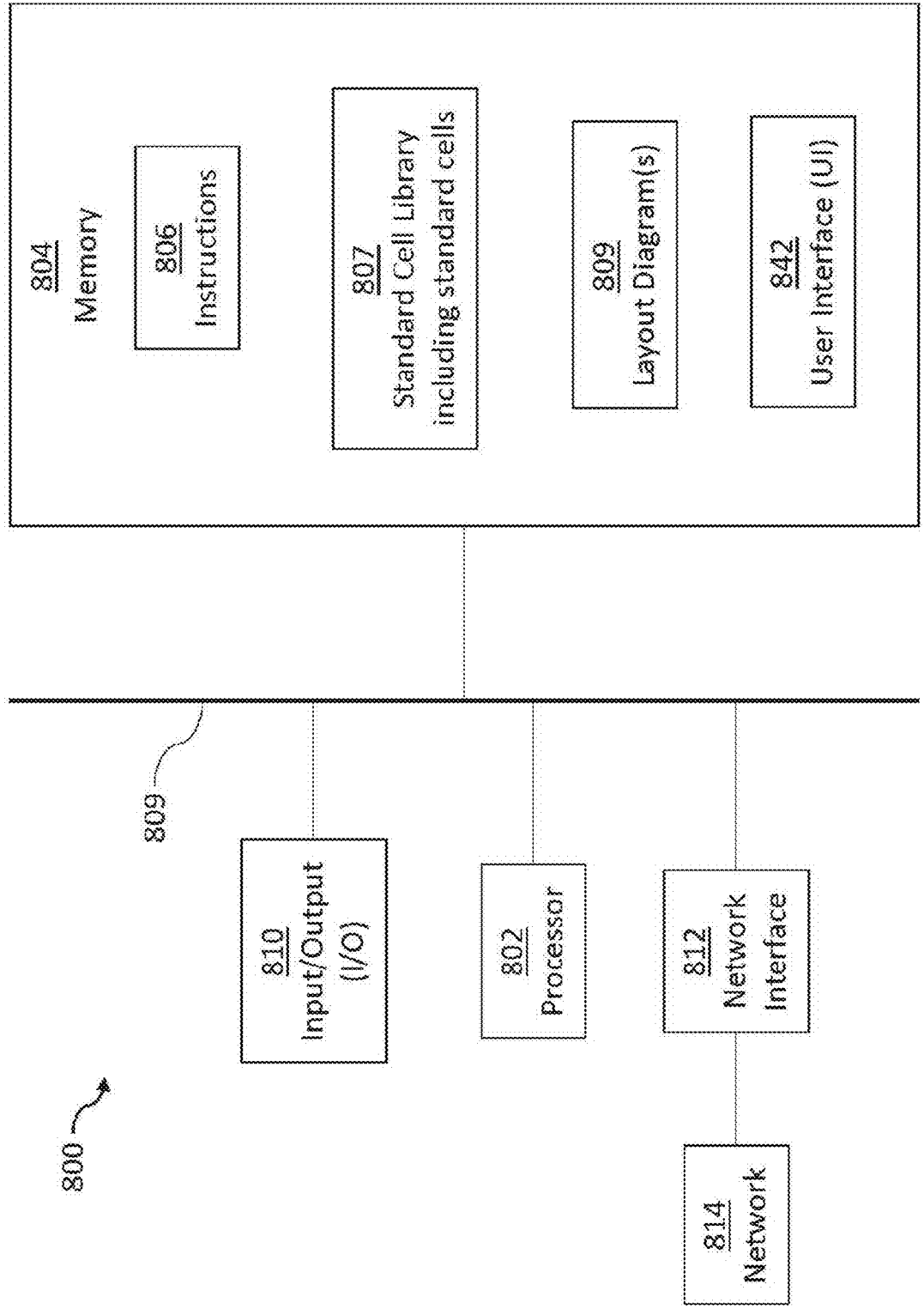
FIG. 8 is a block diagram of an electronic design automation (EDA) system in accordance with some embodiments.

FIG. 8 is a block diagram of an electronic design automation (EDA) system 800 in accordance with some embodiments.

In some embodiments, EDA system 800 includes an automatic placement and routing (APR) system. Methods described herein of designing layout diagrams represent wire routing arrangements, in accordance with one or more embodiments, are implementable, for example, using EDA system 800, in accordance with some embodiments.

In some embodiments, EDA system 800 is a general purpose computing device including a hardware processor 802 and a non-transitory, computer-readable storage medium 804. Storage medium 804, amongst other things, is encoded with, i.e., stores, computer program code 806, i.e., a set of executable instructions. Execution of instructions 806 by hardware processor 802 represents (at least in part) an EDA tool which implements a portion or all of the methods described herein in accordance with one or more embodiments (hereinafter, the noted processes and/or methods).

Processor 802 is electrically coupled to computer-readable storage medium 804 via a bus 808. Processor 802 is also electrically coupled to an I/O interface 810 by bus 808. A network interface 812 is also electrically connected to processor 802 via bus 808. Network interface 812 is connected to a network 814, so that processor 802 and computer-readable storage medium 804 are capable of connecting to external elements via network 814. Processor 802 is configured to execute computer program code 806 encoded in computer-readable storage medium 804 in order to cause system 800 to be usable for performing a portion or all of the noted processes and/or methods. In one or more embodiments, processor 802 is a central processing unit (CPU), a multi-processor, a distributed processing system, an application specific integrated circuit (ASIC), and/or a suitable processing unit.

In one or more embodiments, computer-readable storage medium 804 is an electronic, magnetic, optical, electromagnetic, infrared, and/or a semiconductor system (or apparatus or device). For example, computer-readable storage medium 804 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 804 includes a compact disk-read only memory (CD-ROM), a compact disk-read/write (CD-R/W), and/or a digital video disc (DVD).

In one or more embodiments, storage medium 804 stores computer program code 806 configured to cause system 800 (where such execution represents (at least in part) the EDA tool) to be usable for performing a portion or all of the noted processes and/or methods. In one or more embodiments, storage medium 804 also stores information which facilitates performing a portion or all of the noted processes and/or methods. In one or more embodiments, storage medium 804 stores library 807 of standard cells including such standard cells as disclosed herein. In one or more embodiments, storage medium 804 stores one or more layout diagrams 809 corresponding to one or more layouts disclosed herein.

EDA system 800 includes I/O interface 810. I/O interface 810 is coupled to external circuitry. In one or more embodiments, I/O interface 810 includes a keyboard, keypad, mouse, trackball, trackpad, touchscreen, and/or cursor direction keys for communicating information and commands to processor 802.

EDA system 800 also includes network interface 812 coupled to processor 802. Network interface 812 allows system 800 to communicate with network 814, to which one or more other computer systems are connected. Network interface 812 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 800.

System 800 is configured to receive information through I/O interface 810. The information received through I/O interface 810 includes one or more of instructions, data, design rules, libraries of standard cells, and/or other parameters for processing by processor 802. The information is transferred to processor 802 via bus 808. EDA system 800 is configured to receive information related to a user interface (UI) through I/O interface 810. The information is stored in computer-readable medium 804 as UI 842.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 800. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 9:
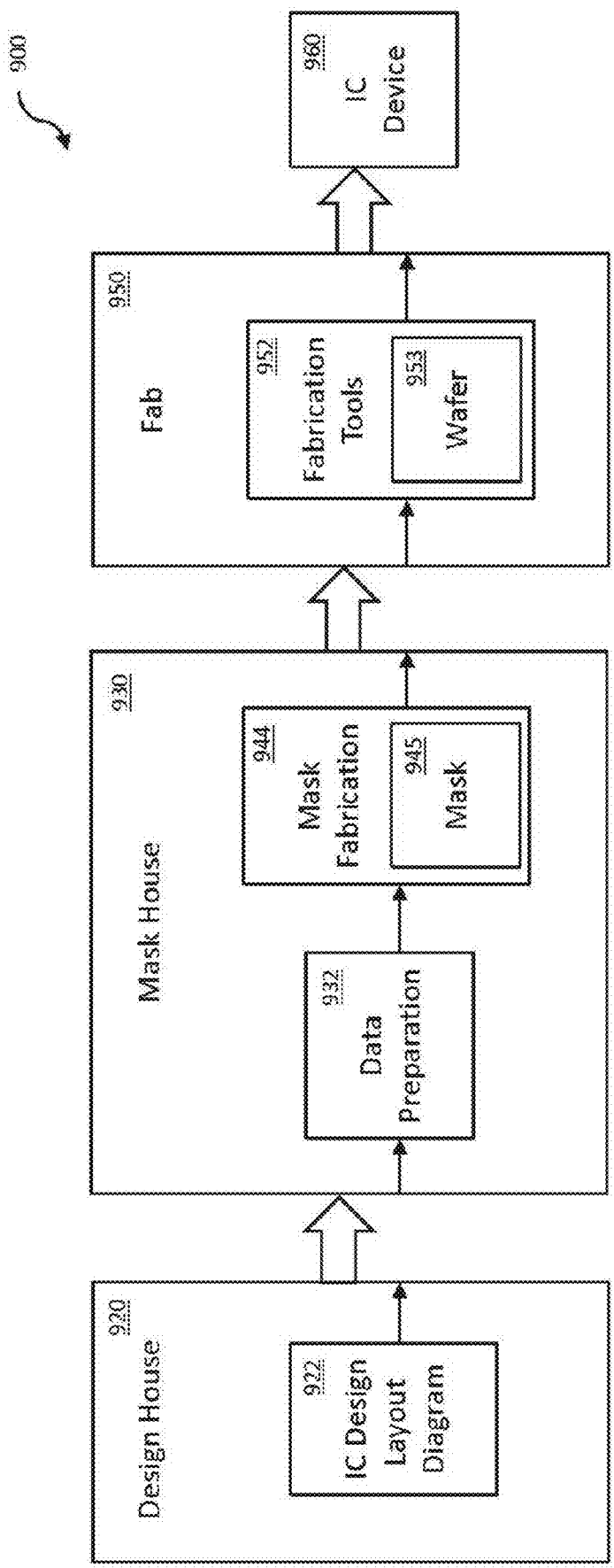
FIG. 9 is a block diagram of an integrated circuit (IC) manufacturing system, and an IC manufacturing flow associated therewith, in accordance with some embodiments.

FIG. 9 is a block diagram of an integrated circuit (IC) manufacturing system 900, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 900.

In FIG. 9, IC manufacturing system 900 includes entities, such as a design house 920, a mask house 930, and an IC manufacturer/fabricator (fab) 950, that interact with one another in the design, development, and manufacturing cycles and/or services related to manufacturing an IC device 960. The entities in system 900 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 920, mask house 930, and IC fab 950 is owned by a single larger company. In some embodiments, two or more of design house 920, mask house 930, and IC fab 950 coexist in a common facility and use common resources.

Design house (or design team) 920 generates an IC design layout diagram 922. IC design layout diagram 922 includes various geometrical patterns designed for an IC device 960. The geometrical patterns correspond to patterns of metal, oxide, or semiconductor layers that make up the various components of IC device 960 to be fabricated. The various layers combine to form various IC features. For example, a portion of IC design layout diagram 922 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 920 implements a proper design procedure to form IC design layout diagram 922. The design procedure includes one or more of logic design, physical design or place and route. IC design layout diagram 922 is presented in one or more data files having information of the geometrical patterns. For example, IC design layout diagram 922 can be expressed in a GDSII file format or DFII file format.

Mask house 930 includes data preparation 932 and mask fabrication 944. Mask house 930 uses IC design layout diagram 922 to manufacture one or more masks 945 to be used for fabricating the various layers of IC device 960 according to IC design layout diagram 922. Mask house 930 performs mask data preparation 932, where IC design layout diagram 922 is translated into a representative data file (RDF). Mask data preparation 932 provides the RDF to mask fabrication 944. Mask fabrication 944 includes a mask writer. A mask writer converts the RDF to an image on a substrate, such as a mask (reticle) 945 or a semiconductor wafer 953. The design layout diagram 922 is manipulated by mask data preparation 932 to comply with particular characteristics of the mask writer and/or requirements of IC fab 950. In FIG. 9, mask data preparation 932 and mask fabrication 944 are illustrated as separate elements. In some embodiments, mask data preparation 932 and mask fabrication 944 can be collectively referred to as mask data preparation.

In some embodiments, mask data preparation 932 includes optical proximity correction (OPC) which uses lithography enhancement techniques to compensate for image errors, such as those that can arise from diffraction, interference, other process effects and the like. OPC adjusts IC design layout diagram 922. In some embodiments, mask data preparation 932 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 932 includes a mask rule checker (MRC) that checks the IC design layout diagram 922 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 922 to compensate for photolithographic implementation effects during mask fabrication 944, which may undo part of the modifications performed by OPC in order to meet mask creation rules.

In some embodiments, mask data preparation 932 includes lithography process checking (LPC) that simulates processing that will be implemented by IC fab 950 to fabricate IC device 960. LPC simulates this processing based on IC design layout diagram 922 to create a simulated manufactured device, such as IC device 960. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus (DOF), mask error enhancement factor (MEEF), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 922.

It should be understood that the above description of mask data preparation 932 has been simplified for the purposes of clarity. In some embodiments, data preparation 932 includes additional features such as a logic operation (LOP) to modify the IC design layout diagram 922 according to manufacturing rules. Additionally, the processes applied to IC design layout diagram 922 during data preparation 932 may be executed in a variety of different orders.

After mask data preparation 932 and during mask fabrication 944, a mask 945 or a group of masks 945 are fabricated based on the modified IC design layout diagram 922. In some embodiments, mask fabrication 944 includes performing one or more lithographic exposures based on IC design layout diagram 922. In some embodiments, an electron-beam (e-beam) or a mechanism of multiple e-beams is used to form a pattern on a mask (photomask or reticle) 945 based on the modified IC design layout diagram 922. Mask 945 can be formed in various technologies. In some embodiments, mask 945 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 945 includes a transparent substrate (e.g., fused quartz) and an opaque material (e.g., chromium) coated in the opaque regions of the binary mask. In another example, mask 945 is formed using a phase shift technology. In a phase shift mask (PSM) version of mask 945, various features in the pattern formed on the phase shift mask are configured to have proper phase difference to enhance the resolution and imaging quality. In various examples, the phase shift mask can be attenuated PSM or alternating PSM. The mask(s) generated by mask fabrication 944 is used in a variety of processes. For example, such a mask(s) is used in an ion implantation process to form various doped regions in semiconductor wafer 953, in an etching process to form various etching regions in semiconductor wafer 953, and/or in other suitable processes.

IC fab 950 is an IC fabrication business that includes one or more manufacturing facilities for the fabrication of a variety of different IC products. In some embodiments, IC Fab 950 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 950 includes fabrication tools 952 configured to execute various manufacturing operations on semiconductor wafer 953 such that IC device 960 is fabricated in accordance with the mask(s), e.g., mask 945. In various embodiments, fabrication tools 952 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 950 uses mask(s) 945 fabricated by mask house 930 to fabricate IC device 960. Thus, IC fab 950 at least indirectly uses IC design layout diagram 922 to fabricate IC device 960. In some embodiments, semiconductor wafer 953 is fabricated by IC fab 950 using mask(s) 945 to form IC device 960. In some embodiments, the IC fabrication includes performing one or more lithographic exposures based at least indirectly on IC design layout diagram 922. Semiconductor wafer 953 includes a silicon substrate or other proper substrate having material layers formed thereon. Semiconductor wafer 953 further includes one or more of various doped regions, dielectric features, multi-level interconnects, and the like (formed at subsequent manufacturing steps).

An aspect of the present disclosure relates to an integrated circuit. The integrated circuit includes a wide type-one active-region structure and a wide type-two active-region structure; a narrow type-one active-region structure and a narrow type-two active-region structure. The circuit also includes wide type-one transistors in the wide type-one active-region structure and narrow type-one transistors in the narrow type-one active-region structure, where an average gate width of the wide type-one transistors is larger than an average gate width of the narrow type-one transistors. The circuit also includes wide type-two transistors in the wide type-two active-region structure and narrow type-two transistors in the narrow type-two active-region structure, where an average gate width of the wide type-two transistors is larger than an average gate width of the narrow type-two transistors; a first inverter and a first transmission gate constructed with the wide type-one transistors and the wide type-two transistors, where the first transmission gate is connected to an output of the first inverter; and a first clocked inverter constructed with the narrow type-one transistors and the narrow type-two transistors, where the first clocked inverter has an input connected to the output of the first inverter and has an output connected to an input of the first inverter.

Another aspect of the present disclosure relates to an integrated circuit. The integrated circuit includes a wide type-one active-region structure and a wide type-two active-region structure; a narrow type-one active-region structure and a narrow type-two active-region structure. The circuit also includes wide type-one transistors in the wide type-one active-region structure and narrow type-one transistors in the narrow type-one active-region structure, where an average gate width of the wide type-one transistors is larger than an average gate width of the narrow type-one transistors. The circuit also includes wide type-two transistors in the wide type-two active-region structure and narrow type-two transistors in the narrow type-two active-region structure, where an average gate width of the wide type-two transistors is larger than an average gate width of the narrow type-two transistors; a gated inverter a first inverter, and an output driver constructed with the wide type-one transistors and the wide type-two transistors, where the first inverter has an input connected to an output of the gated inverter and has an output connected to an input of the output driver; and a first clocked inverter constructed with the narrow type-one transistors and the narrow type-two transistors, where the first clocked inverter has an input connected to the output of the first inverter and has an output connected to the input of the first inverter.

An aspect of the present disclosure relates to a method. The method includes fabricating a wide type-one active-region structure and a narrow type-one active-region structure where an average width of the wide type-one active-region structure is larger than an average width of the narrow type-one active-region structure; fabricating a wide type-two active-region structure and a narrow type-two active-region structure where an average width of the wide type-two active-region structure is larger than an average width of the narrow type-two active-region structure; forming a first inverter and a first transmission gate with wide type-one transistors in the wide type-one active-region structure and wide type-two transistors in the wide type-two active-region structure, where the first transmission gate is connected to an output of the first inverter; forming a first clocked inverter with narrow type-one transistors in the narrow type-one active-region structure and narrow type-two transistors in the narrow type-two active-region structure. The method also includes connecting an input of the first clocked inverter with the output of the first inverter, and connecting the output of the first clocked inverter with an input of the first inverter.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. An integrated circuit comprising:
   a wide type-one active-region structure and a wide type-two active-region structure;
   a narrow type-one active-region structure and a narrow type-two active-region structure;
   wide type-one transistors in the wide type-one active-region structure and narrow type-one transistors in the narrow type-one active-region structure, wherein an average gate width of the wide type-one transistors is larger than an average gate width of the narrow type-one transistors;
   wide type-two transistors in the wide type-two active-region structure and narrow type-two transistors in the narrow type-two active-region structure, wherein an average gate width of the wide type-two transistors is larger than an average gate width of the narrow type-two transistors;
   a first inverter and a first transmission gate constructed with the wide type-one transistors and the wide type-two transistors, wherein the first transmission gate is connected to an output of the first inverter; and
   a first clocked inverter constructed with the narrow type-one transistors and the narrow type-two transistors, wherein the first clocked inverter has an input connected to the output of the first inverter and has an output connected to an input of the first inverter.

2. The integrated circuit of claim 1, further comprising:
   a gated inverter constructed with the wide type-one transistors and the wide type-two transistors, wherein the first inverter is coupled between an output of the gated inverter and the input of the first transmission gate.

3. The integrated circuit of claim 1, further comprising:
   a clock gated input circuit having a second transmission gate constructed with the wide type-one transistors and the wide type-two transistors, wherein the first inverter is coupled between an output of the second transmission gate and the input of the first transmission gate.

4. The integrated circuit of claim 1, further comprising:
   a clock gated input circuit constructed with the wide type-one transistors and the wide type-two transistors, wherein the first inverter has the input connected to an output of the clock gated input circuit and has the output connected to the input of the first transmission gate, and wherein the clock gated input circuit, the first inverter, the first transmission gate, are arranged as an ordered list.

5. The integrated circuit of claim 1, further comprising:
   an output driver constructed with the wide type-one transistors and the wide type-two transistors; and
   a second inverter coupled between an output of the first transmission gate and an input of the output driver.

6. The integrated circuit of claim 5, wherein an ordered list of the first inverter, the first transmission gate, the second inverter, and the output driver are arranged along a first direction.

7. The integrated circuit of claim 1, further comprising:
   a gated inverter constructed with the wide type-one transistors and the wide type-two transistors, wherein an ordered list of the gated inverter, the first inverter, and the first transmission gate are arranged along a first direction.

8. The integrated circuit of claim 1, wherein the wide type-one active-region structure and the wide type-two active-region structure are laterally positioned between the narrow type-one active-region structure and the narrow type-two active-region structure.

9. The integrated circuit of claim 1, wherein the narrow type-one active-region structure and the narrow type-two active-region structure are laterally positioned between the wide type-one active-region structure and the wide type-two active-region structure.

10. The integrated circuit of claim 1, wherein the wide type-one active-region structure and the wide type-two active-region structure forms a first pair of adjacent active-region structures, and the narrow type-one active-region structure and the narrow type-two active-region structure forms a second pair of adjacent active-region structures.

11. The integrated circuit of claim 10, wherein the wide type-one active-region structure and the narrow type-one active-region structure are laterally positioned between the wide type-two active-region structure and the narrow type-two active-region structure.

12. The integrated circuit of claim 1, wherein a first average width of the wide type-one active-region structure within areas used to construct the wide type-one transistors is larger than a second average width of the narrow type-one active-region structure within areas used to construct the narrow type-one transistors.

13. The integrated circuit of claim 1, wherein a first average width of the wide type-two active-region structure within areas used to construct the wide type-two transistors is larger than a second average width of the narrow type-two active-region structure within areas used to construct the narrow type-two transistors.

14. The integrated circuit of claim 1, wherein the first inverter is a resettable inverter.

15. An integrated circuit comprising:
    a wide type-one active-region structure and a wide type-two active-region structure;
    a narrow type-one active-region structure and a narrow type-two active-region structure;
    wide type-one transistors in the wide type-one active-region structure and narrow type-one transistors in the narrow type-one active-region structure, wherein an average gate width of the wide type-one transistors is larger than an average gate width of the narrow type-one transistors;
    wide type-two transistors in the wide type-two active-region structure and narrow type-two transistors in the narrow type-two active-region structure, wherein an average gate width of the wide type-two transistors is larger than an average gate width of the narrow type-two transistors;
    a gated inverter, a first inverter, and an output driver constructed with the wide type-one transistors and the wide type-two transistors, wherein the first inverter has an input connected to an output of the gated inverter and has an output connected to an input of the output driver; and a first clocked inverter constructed with the narrow type-one transistors and the narrow type-two transistors, wherein the first clocked inverter has an input connected to the output of the first inverter and has an output connected to the input of the first inverter.

16. The integrated circuit of claim 15, the gated inverter is a clocked inverter.

17. The integrated circuit of claim 15, wherein the output driver is either a buffer or an inverter.

18. The integrated circuit of claim 15, wherein an average width of the wide type-one active-region structure within areas used to construct the wide type-one transistors is larger than an average width of the narrow type-one active-region structure within areas used to construct the narrow type-one transistors, and wherein an average width of the wide type-two active-region structure within areas used to construct the wide type-two transistors is larger than an average width of the narrow type-two active-region structure within areas used to construct the narrow type-two transistors.

19. A method comprising:

fabricating a wide type-one active-region structure and a narrow type-one active-region structure, wherein an average width of the wide type-one active-region structure is larger than an average width of the narrow type-one active-region structure;

fabricating a wide type-two active-region structure and a narrow type-two active-region structure, wherein an average width of the wide type-two active-region structure is larger than an average width of the narrow type-two active-region structure;

forming a first inverter and a first transmission gate with wide type-one transistors in the wide type-one active-region structure and wide type-two transistors in the wide type-two active-region structure, wherein the first transmission gate is connected to an output of the first inverter;

forming a first clocked inverter with narrow type-one transistors in the narrow type-one active-region structure and narrow type-two transistors in the narrow type-two active-region structure; and connecting an input of the first clocked inverter with the output of the first inverter, and connecting the output of the first clocked inverter with an input of the first inverter.

20. The method of claim 19, comprising:

forming a gated inverter with the wide type-one transistors and the wide type-two transistors, wherein an ordered list of the gated inverter, the first inverter, and the first transmission gate are arranged along a first direction.

* * * * *